US009208135B1

(12) United States Patent
Lopez

(10) Patent No.: US 9,208,135 B1
(45) Date of Patent: Dec. 8, 2015

(54) TOOLS TO INCREASE SITE PERFORMANCE

(75) Inventor: Gustavo E. Lopez, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 650 days.

(21) Appl. No.: 13/050,788

(22) Filed: Mar. 17, 2011

(51) Int. Cl.
*G06F 3/00* (2006.01)
*G06F 17/22* (2006.01)
*G06F 17/30* (2006.01)

(52) U.S. Cl.
CPC ...... *G06F 17/2247* (2013.01); *G06F 17/30905* (2013.01)

(58) Field of Classification Search
CPC .............. G06F 17/2247; G06F 17/30905
USPC .................... 715/760, 762; 707/727
See application file for complete search history.

(56) References Cited

U.S. PATENT DOCUMENTS

| 6,360,235 | B1 * | 3/2002 | Tilt et al. ..................... 715/205 |
| 8,078,614 | B2 * | 12/2011 | Clary et al. .................. 707/727 |
| 8,140,989 | B2 * | 3/2012 | Cohen et al. ................ 715/764 |
| 8,161,042 | B2 | 4/2012 | Clary et al. |
| 2002/0188717 | A1 | 12/2002 | Mushlin et al. |
| 2003/0105604 | A1 | 6/2003 | Ash et al. |
| 2003/0130982 | A1 | 7/2003 | Kasriel et al. |
| 2004/0100510 | A1 * | 5/2004 | Milic-Frayling et al. ..... 345/864 |
| 2005/0060168 | A1 | 3/2005 | Murashige et al. |
| 2006/0212804 | A1 * | 9/2006 | Jackson et al. ............... 715/520 |
| 2008/0104224 | A1 | 5/2008 | Litofsky et al. |
| 2009/0040927 | A1 | 2/2009 | Tsun |
| 2010/0088411 | A1 | 4/2010 | Litofsky et al. |
| 2011/0119330 | A1 | 5/2011 | Baldwin et al. |

* cited by examiner

*Primary Examiner* — Andrey Belousov
(74) *Attorney, Agent, or Firm* — Lee & Hayes, PLLC

(57) ABSTRACT

Techniques described herein provide one or more tools to operators of one or more sites (e.g., websites) to facilitate increased performance of the respective sites. More specifically, these tools may provide feedback to the operators that allows the operators to make informed decisions regarding the use of features and content on their respective sites, which in turn may decrease latency experienced by the users of these sites.

31 Claims, 18 Drawing Sheets

TOOLS TO INCREASE SITE PERFORMANCE

BACKGROUND

Companies utilizing network-accessible sites (e.g., websites, intranets, etc.) continually strive to make their sites more dynamic and compelling for users to use. To do so, these companies often implement an array of features that collectively result in engaging and dynamic sites. These features may include, for instance, images, scripts, tables, externalized features, multimedia platform content (e.g., Adobe Flash® content), and the like. However, in addition to helping provide engaging sites, these features may add unwanted latency into the sites. That is, while companies may desire to add these types of rich features, the addition of such features may inadvertently add latency, thus decreasing the efficacy of their respective sites.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
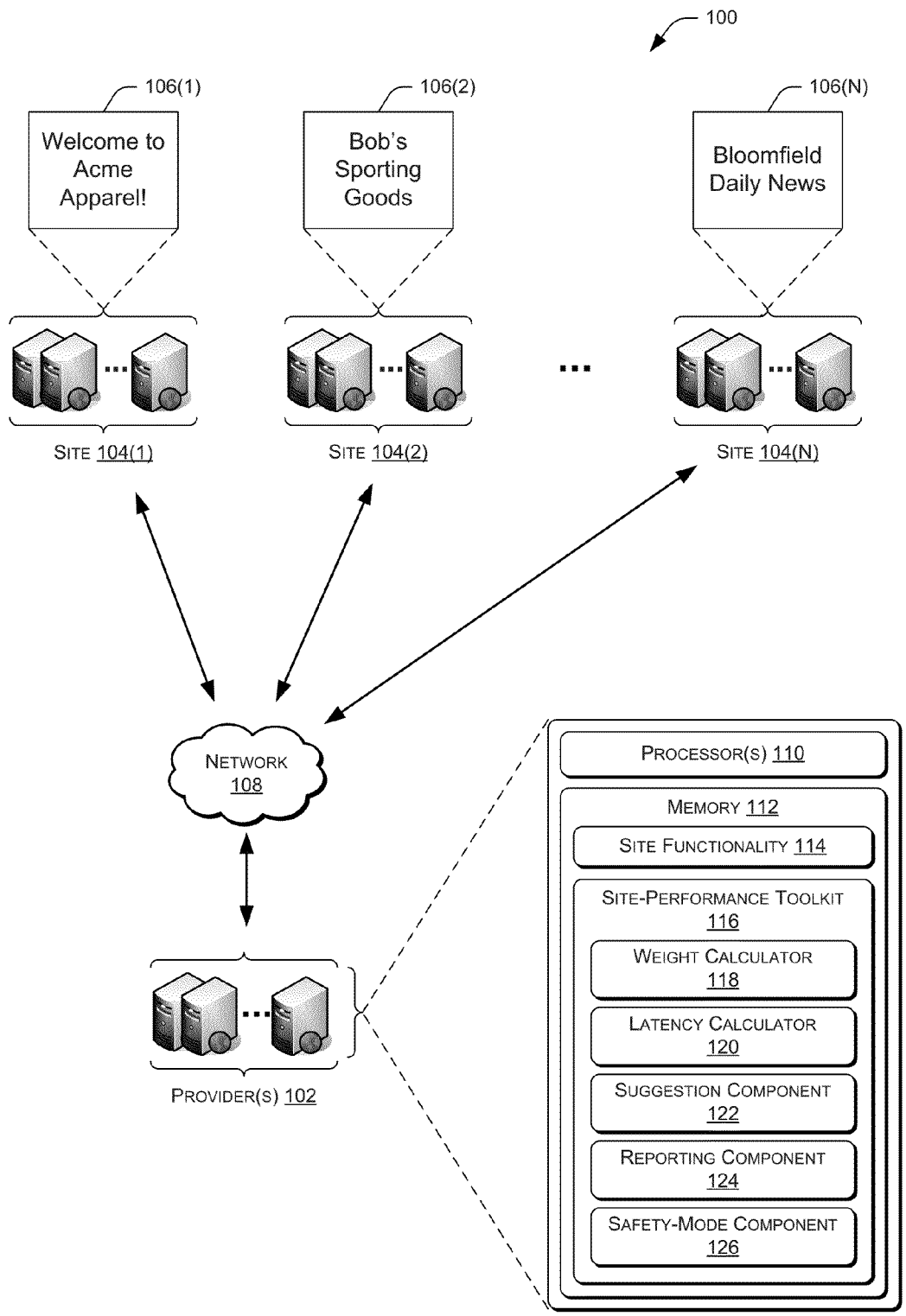
FIG. 1 is a schematic diagram of an example architecture that includes a provider that supplies site functionality to one or more sites (e.g., websites). In addition, the provider supplies a site-performance toolkit that provides feedback to operators of the respective sites. This feedback enables the operators to make educated decisions regarding whether to deploy certain site features, or whether to refrain from deploying such features for the purpose of decreasing site latency.

This disclosure describes, in part, providing one or more tools to operators of one or more sites (e.g., websites) to facilitate increased performance of the respective sites. More specifically, these tools may provide feedback to the operators that allows the operators to make informed decisions regarding the use of features and content on their respective sites, which in turn may decrease latency experienced by the users of these sites.

In some instances, a provider of the tools also provides rich functionality that the operators of the sites may utilize in creating their respective sites. Therefore, by providing both rich site functionality and the afore-mentioned feedback tools, the provider allows site operators to maintain control of their sites' designs while ensuring that the operators make informed decisions along the way. This combination of rich functionality and feedback may result in high-performance (e.g., low latency) sites that still implement rich functionality. Furthermore, this feedback may be presented to an operator of a site in any manner. As described and illustrated below, for instance, this feedback may be in the form of user interfaces (UIs) that are understandable to technical operators of the site (e.g., web developers, etc.) and/or non-technical operators of the site (e.g., marketing employees, etc.).

In some instances, the tools may provide feedback that informs operators when certain portions of an operator's site have page weights that are greater than a predefined page weight (e.g., a measurement of a page or a portion of a page in bytes). For instance, the tools may identify a page weight associated with an entire site, with one or more pages of the site, with one or more slots of one or more pages of the site, or with one or more features of one or more pages of the site (e.g., menu or navigation bars, shopping cart widgets, advertisements, etc.). In response, the tools may identify those portions (e.g., slots, pages, site, etc.) that are greater than a threshold, and/or may indicate the actual weight of these portions.

By surfacing this feedback to the site operator, the operator is able to make educated decisions regarding tradeoffs between rich functionality and site performance. For instance, in response to receiving feedback that a weight associated with particular slot is greater than a predefined threshold (which the site operator may configure), the operator may decide to remove and/or modify content in that slot for the purpose of increasing performance of the page on which the slot resides. This increased performance may come in the form of decreased latency experienced by a user of the site in response to requesting and receiving that particular page at a client computing device of the user.

While the tools may identify actual page weights and/or weights that are greater than a predefined threshold, the tools may additionally or alternatively identify latencies associated with portions of the site. For instance, the tools may surface, to the site operator, "to-the-glass" latency for a particular page of the site, for a particular portion of a page of the site (e.g., an "above-the-fold" portion), for a particular slot of a page of the site, and/or the like. To do so, the tools may provide requests to the site and may track average latencies to render content associated with these different portions of the site. Again, the tools may surface the actual measured latency, and/or may surface portions of the site having latencies that are greater than a predefined threshold. As with the page weight example above, the site operator or another entity may specify this latency threshold. Again, by providing this latency feedback to the site operator, the site operator is able to make educated decisions regarding how to balance the use of rich site features and site performance.

In some instances, the tools may provide this type of feedback to the site operator prior to the site operator launching the site or prior to the operator launching particular versions of pages of the site (e.g., revised or new pages of the site). Therefore, the site operator is able to improve the performance of the site prior to launch. In other instances, meanwhile, the tools may additionally or alternatively provide this feedback to the site operator after launch of the site and/or the new or revised pages of the site. Furthermore, while the following examples describe providing visual feedback to the user, in some implementations the tools may surface this feedback audibly and/or in any other manner.

In addition to providing feedback in the manner described above, in some instances the tools described below may provide suggestions to the site operators for improving the performance of their respective sites. For instance, the tools may identify pages having large weights and pages having significantly less weight and, in response, may suggest that the site operator consider moving content from the heavy page to the light page. In another example, the tools may identify that a particularly large image has not been compressed and, in response, the tools may suggest that the site operator compress the image to save page weight and, hence, increase performance of the site. Numerous other examples are described below.

In addition to providing these suggestions, the tools may enable the operator to simulate the suggestions and, in some instances, may enable the operator to actually automatically make the change. For instance, using the image compression example, the suggestion that the tools provide may include an icon that, when selected by the site operator, renders both a compressed and uncompressed version of the subject image. By rendering both versions of the image in this side-by-side manner, the site operator is able to view any potential quality loss that may occur in the compressed image. With this information in mind, the site operator may make an educated decision regarding whether or not to follow the suggestion and use the compressed image.

For instance, the site operator may decide that any quality loss is imperceptible and, hence, may choose to make the change. Conversely, the site operator may decide that the image at hand is of too much importance on the site to sacrifice any quality loss at all. As such, the site operator may refrain from following the suggestion. In either instance, the site operator makes a decision that is more educated than before the operator receives the described feedback.

Furthermore, in addition to allowing the site operator to view a simulation of the suggested change, the described tools may provide an icon that is selectable by the site operator to make the suggested change. For instance, after viewing a side-by-side comparison of the compressed and uncompressed versions of the images described above, the site operator may select (potentially from the same page) an icon that implements the suggested change by replacing the uncompressed image with the compressed image on behalf of the site operator.

In addition, the tools described below may surface certain benchmark data to the site operator. For instance, the tools may measure a "to-the-glass" latency for particular portions of the site (e.g., pages, slots, etc.) and may compare this data to corresponding portions of one or more other sites. With this information, the site operator may understand how the operator's site compares in terms of performance to other sites. This latency comparison may take place on a per-site basis, a per-page basis, or a per-slot basis, as described in detail below.

In some instances, the site operator may identify the one or more sites to which the tools compare the operator's site to. For instance, the site operator may identify one or more competitor sites and, in response, the tools may compare latencies between the operator's sites and the competitor's sites. The site operator may identify these competitor sites explicitly (e.g., by name, URL address, etc.), or the site operator may specify a particular category and/or sub-category of sites to which to compare against. For instance, if the site at hand is an e-commerce apparel site (i.e., a site that sells apparel online via the site), then the site operator may choose to compare his or her site against other e-commerce sites, other e-commerce apparel sites, and/or the like. Of course, while a few examples have been given, is to be appreciated that the site operators may identify competitor sites at any other greater or lesser level of granularity.

In still other instances, the site operator may compare latencies within different portions of his or her own site. For instance, the site operator may choose to compare a latency associated with a first page with a latency associated with a second page. The first and second pages may comprise different areas of the site, or may comprise different versions of a same portion of the site. Similarly, the site operator may choose to compare corresponding features between the operator's site and one or more other sites (e.g., navigation bar latency, advertisement latency, etc.). Again, while a few examples have been given, is to be appreciated that the site operator may choose to compare any other portion of the site with competitor sites at any other greater or lesser specified level of granularity.

After collecting some or all of the data described above, the tools may proceed to generate a report for consumption by the site operator. This report may be standard across multiple different sites. These reports may include latencies of the site at hand, weights of the site, comparisons between latencies of the site and other sites, comparisons of weights of the site and other sites, and/or any sort of statistics that may be helpful in allowing the site operator to comprehend the performance of his or her site (e.g., standard deviation, mean latency, etc.). To continue the example from above, this report may indicate to the example site operator that his or her site "is in the $94^{th}$ percentile for overall performance in the category of e-commerce and the sub-category of apparel".

Finally, in some instances described below, the tools may enable site operators to configure a "safety mode" that, when implemented, may help prevent performance decreases due to heavy page weight or the like. As described in detail below, the operators may restrict the ability of certain operators of the site to deploy pages that have a weight and/or a latency that is greater than a predefined threshold. For instance, a first site operator may specify that a certain set of other operators (e.g., other employees of a particular company) may not deploy pages that have a page weight that is greater than a certain amount, and/or may not deploy pages that have an average latency that is greater than a certain amount. This restriction may apply to each page of the site, and/or to one or more particular pages.

In addition or in the alternative, the tools may allow the site operator to set this restriction on a per-page or per-site basis, regardless of the identity of the user/operator. Here, the tools will refrain from launching any version of a page (either a new page or a revised page) when that particular version of the page is greater than a predefined maximum weight or latency. By doing so, the tools allow the operator to lessen or eliminate the chance of another operator of the site inadvertently and adversely impacting the performance of the site by launching one or more pages having a relatively large page weight and/or latency.

For purposes of discussion, the site-performance tools are described in the example architecture below. However, it should be appreciated that the described techniques may be implemented in multiple other architectures and environments.

Example Architecture

FIG. 1 is a schematic diagram of an example architecture 100 that includes one or more providers 102 that supply site functionality to one or more sites (e.g., intranets, websites, etc.) 104(1), 104(2), ..., 104(N), as well a site-performance toolkit that provides feedback to operators of the respective sites 104(1)-(N). This feedback enables the operators to make educated decisions regarding whether to deploy certain site features, or whether to refrain from deploying such features for the purpose of decreasing site latency.

The sites 104(1)-(N) may comprise any sort of site, such as e-commerce sites, news sites, educational sites, or the like. In the illustrated example, the site 104(1) renders a user interface 106(1) indicating that the site is an e-commerce apparel retailer, the site 104(2) renders a user interface 106(2) indicating that the site is an e-commerce sporting goods retailer, and the site 104(N) renders a user interface 106(N) indicating that the site is a news site. Again, while FIG. 1 illustrates several example sites, the techniques described herein apply to an array of different types of sites.

In some instances, operators of the sites 104(1)-(N) may access the provider 102 over a network 108. To do so, the site operators may operate any sort of computing device, such as personal computers, personal digital assistants (PDAs), laptop computers, mobile phones, set-top boxes, game consoles, electronic book readers, and so forth. The network 108, meanwhile, represents any one or combination of multiple different types of networks, such as cable networks, the Internet, private intranets, wireless networks, and the like. Furthermore, while FIG. 1 illustrates the sites 104(1)-(N) communicating with the provider 102 over the network 108, the techniques may apply in any other networked or non-networked architectures.

One or more servers, perhaps arranged in a cluster or as a server farm, may host the example provider 102. Other server architectures may also be used to host the provider 102. As illustrated, the servers of the provider 102 include one or more processors 110 and memory 112. As discussed in detail below, the memory stores or otherwise has access to multiple modules and components, which may run as software on the web servers themselves. The memory 112 may comprise volatile and/or nonvolatile memory, removable and/or non-removable media, and the like. Further, the memory 112 may be implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device.

While FIG. 1 illustrates the servers of the provider 102 as containing the illustrated modules, these modules and their corresponding functionality may be spread amongst multiple other actors. For instance, in some instances servers controlled by the sites 104(1)-(N) themselves may store some or all of these modules.

As illustrated, the memory 112 stores site functionality 114 and a site-performance toolkit 116. The site functionality 114 is representative of one or more features of a site supplied by the provider 102 and utilized by the sites 104(1)-(N). In some instances, for example, the provider 102 actually provides a majority or all of the functionality of the sites 104(1)-(N). In these instances, the sites 104(1)-(N) include user interfaces that have been branded in association with the particular sites, while the provider 102 provides all of the backend functionality underlying these sites. That is, the provider 102 may actually supply and operate the functionality for some or each of the sites 104(1)-(N), even though user interfaces served to users that navigate to these sites are separately branded. That is, users may see "Welcome to Acme Apparel!" when navigating to the site 104(1), while seeing "Bob's Sporting Goods" when navigating to the site 104(2), even though the provider 102 actually provides the functionality for both of these sites. In these instances, the site functionality 114 comprises all or substantially all of the features running on the respective sites.

In other instances, meanwhile, the provider 102 may provide only a small piece of functionality to the sites 104(1)-

(N). In these instances, the site functionality 114 provides only small support to some or all of the sites. Furthermore, in still other instances, some or all of the sites 104(1)-(N) may themselves provide all or substantially all of the functionality used to operate the sites and, as such, the sites may not utilize the site functionality 114 of the provider 102 at all.

In each of these instances, the site-performance toolkit 116 of the provider 102 may help operators of the sites 104(1)-(N) improve the performance of their respective sites. As described above, the toolkit 116 may provide feedback to the operators to allow the operators to make educated decisions regarding the tradeoff between rich site functionality and site performance.

In the illustrated example, the site-performance toolkit 116 includes a weight calculator 118, a latency calculator 120, a suggestion component 122, a reporting component 124, and a safety-mode component 126. The weight calculator 118 functions to calculate a weight of at least a portion of a site and to provide this calculated weight to the operator of the site, such as one or more of the sites 104(1)-(N). With this information, the operator of the site may determine whether the site as a whole or a particular portion of the site is too large. Hence, this feedback may cause the operator to decide to remove and/or modify certain content of the site for the purpose of increasing performance of the site. The weight calculator 118 may calculate a weight of the site as a whole, a weight of a page or set of pages of the site, or a weight of a slot or set of slots of a page of the site.

The latency calculator 120, meanwhile, may function to simulate one or more requests for a page of the site and may calculate a latency to render content of the page based on the one or more requests. After simulating these requests and calculating the latency (e.g., the average latency, the median latency, etc.), the calculator 120 may provide this information to the operator of the site. Again, with this information, the operator may decide to alter certain aspects of the site to increase performance. Or, the operator may decide that he or she is happy with the current performance of the site, as indicated by the latencies provided by the latency calculator 120. As with the weight calculator 118 above, the latency calculator 120 may calculate a latency for rendering content of the site as a whole, may calculate a latency for rendering content for a page or set of pages of the site, or may calculate a latency for rendering content for a slot or set of slots of a page of the site.

Next, the suggestion component 122 functions to provide one or more suggestions to the operator of the site improve the performance of the site by, for example, reducing the calculated weight or the calculated latency discussed above. In some instances, these suggestions may include:

- a suggestion to compress an image on the site;
- a suggestion to reduce a number of images on a particular page of the site;
- a suggestion to move content from a first portion of the site having a relatively large weight to a second portion of the site having a relatively small weight;
- a suggestion to cache a script that is frequently used on the site; or
- a suggestion to alter an identified nested table of the site.

Of course, while a few example suggestions have been provided, it is to be appreciated that the suggestion component 122 may provide any other similar or different type of suggestion.

The reporting component 124 functions to generate and output a report to the operator the site. In some instances, this report may include the calculated weight, the calculated latency, and the one or more suggestions described above. Furthermore, in some instances this report may include a comparison of the particular site or portions of the site to one or more other sites. For instance, the report may indicate to the operator of the site how certain pages of the site compare to corresponding pages of competitor sites, and/or how the site as a whole compares to these competitor sites.

Finally, the safety-mode component 126 functions to enable the operator the site to specify, for another specified operator of the site, a maximum latency or a maximum weight that the other specified operator cannot exceed when altering a page of the site. By configuring such a safety mode, the safety-mode component 126 later refrains from launching a page altered by the other specified operator when the altered page exceeds the maximum latency or the maximum weight. Therefore, this feature allows the operator of the site to eliminate or reduce the chance that a particular operator of the site will be able to inadvertently and adversely affect performance and/or operation of the site by launching a page that is of too great of weight or latency. Furthermore, in some instances the safety-mode component 126 allows the operator to set this maximum for all operators on all pages of the site, for all operators on certain pages of the site, and the like.

In some instances, when an operator requests to deploy a page on the site that has a latency or weight is greater than a specified maximum weight or latency, the safety-mode component 126 may take additional actions in addition to or other than simply refraining to launch the page. For instance, this component 126 may send a request for permission to launch the page to a predefined administrator of the site. In response to the administrator granting the permission, the component 126 may then deploy the page. If, however, the administrator does not grant such permission, then the component 126 may continue to refrain from deploying the page. By flagging this page to the administrator, the techniques described herein allow an administrator to make case-by-case decisions regarding the deployment of relatively large and/or slow pages.

In yet another example, the safety-mode component 126 may alter this page prior to deploying the page. For instance, in response to determining that a particular page has a greater weight than a specified maximum weight, the component 126 may alter the page to reduce the weight to under the specified maximum weight. To do so, the component 126 may execute on any of the suggestions described above and below. For instance, the component 126 may compress one or more images, may cache a frequently-used script, may move content from above-the-fold to below-the-fold or to another page, or the like. In some instances, the component 126 may remove content from the pages to reduce the weight (e.g., starting with the smallest feature, the largest feature, etc.). While this example describes reducing a weight of a page such that the weight of the page is less than a specified maximum weight, it is to be appreciated that these techniques may similarly apply to reduce a latency of a page to below a specified maximum latency.

When altering a page in this manner, the safety-mode component 126 may, in some instances, utilize a change hierarchy that specifies an order in which to make the alterations. For instance, a particular change hierarchy may specify that the component 126 should first compress images, then cache any frequently-used scripts, then move content to a different page, and the like. Then, the component 126 may work its way down the hierarchy (i.e., may make the changes in the order specified by the hierarchy) until the altered page is less than the specified maximum weight or latency.

In some instances, these hierarchies may be the same for each page of the site. In other instances, meanwhile, different pages and/or categories of pages may have different change hierarchies chosen by operators or other stakeholders of that page or category of pages. Furthermore, these operators may configure the safety-mode component 126 to have different levels of permissions. For instance, a first operator may configure the component such that the component is able to automatically compress images of a page and then deploy the page, but that the safety-mode component 126 is to seek permission from the operator prior to caching a script or moving/removing content. Conversely, another operator may specify that, for other pages of the site, the component 126 is able to make any changes necessary to comply with the specified maximum weight or latency. In yet another example, a particular operator may specify that, for other pages of the site, the safety-mode component 126 is to ask permission before making any changes to a particular page exceeding a specified maximum weight or latency.

Example User Interfaces (UIs)

The following figures describe example user interfaces (UIs) for implementing the techniques described herein. It is to be appreciated, however, that these example UIs are only provided to illustrate the techniques, and that other embodiments may employ multiple different types of UIs having more or fewer features.

Figure 2:
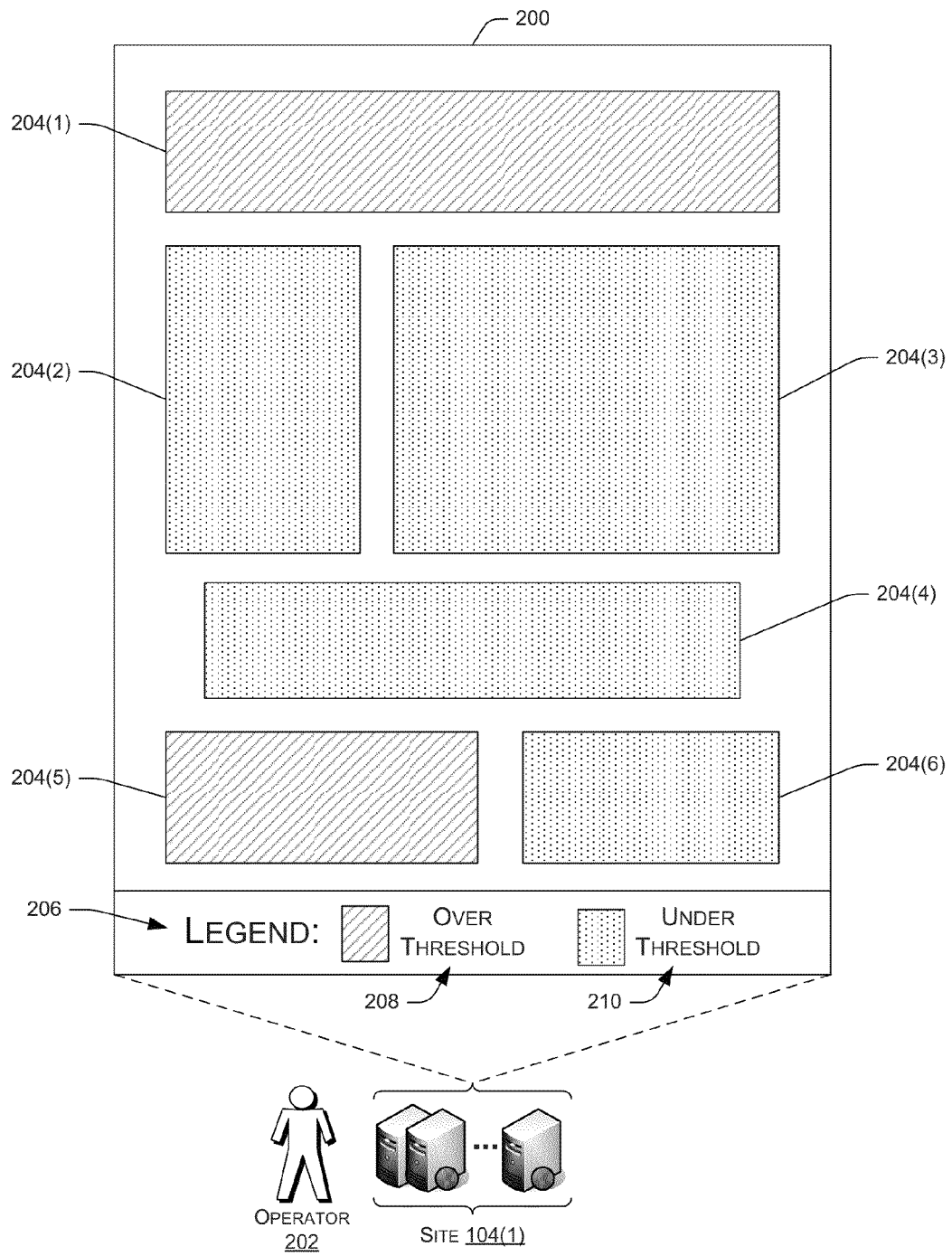
FIG. 2 is a screen rendering of an example user interface (UI) associated with the one of the sites of FIG. 1. This example UI includes multiple slots into which the site has inserted respective features. In addition, this example UI indicates where a latency or weight associated with each slot is over a predefined threshold.

FIG. 2 is a screen rendering of an example UI 200 associated with the example site 104(1) of FIG. 1 that is utilizing the site-performance toolkit 116. As illustrated, this example UI 200 is served to a computing device being operated by an operator 202 of the site 104(1). The operator 202 may comprise a developer of the site, an employee of a company that owns the site 104(1), or the like. In some instances, each of the sites 104(1)-(N) may be associated with multiple operators that are able to make revisions to the sites 104(1)-(N) and/or able to launch different pages of the sites 104(1)-(N).

In this example, the UI 200 includes multiple slots 204(1), 204(2), . . . , 204(6) into which the operator 202 of the site 104(1) has inserted respective features. These features may comprise simple text, images, videos, scripts, multimedia platform content (e.g., Adobe Flash® content), and/or any other type of content. Further, the site functionality 114 of the provider 102 may have provided some or all of the features within these slots 204(1)-(6). Furthermore, the page (e.g., the web page) associated with the currently-illustrated UI 200 may or may not have launched at the time of this example.

While this example does not illustrate the underlying features within the slots 204(1)-(6), the UI 200 includes a legend 206 indicating which of the slots is over a predefined threshold 208 and which of the slots is under the predefined threshold 210. This predefined threshold may represent a specified weight, a specified time needed to load the feature (i.e., a latency), or the like. As illustrated, in this example, the site-performance toolkit 116 indicates that the slots 204(1) and 204(5) are over the predefined threshold, while the slots 204(2), 204(3), 204(4), and 204(6) are under the predefined threshold.

As such, the operator 202 of the site 104(1) may use this information to determine whether or not to alter content on the page. For instance, the operator 202 may decide to revisit the features and/or content within the slots 204(1) and 204(5) in an attempt to bring these slots under the threshold. In some instances, the operator 202 sets the threshold, while in other instances the threshold may comprise a default threshold or may be set by another entity. Further, while the UI 200 of FIG. 2 does not illustrate the underlying features and content, in other instance the above-the-threshold and below-the-threshold indications may occur atop the actual content within the slots 204(1)-(6).

Figure 3:
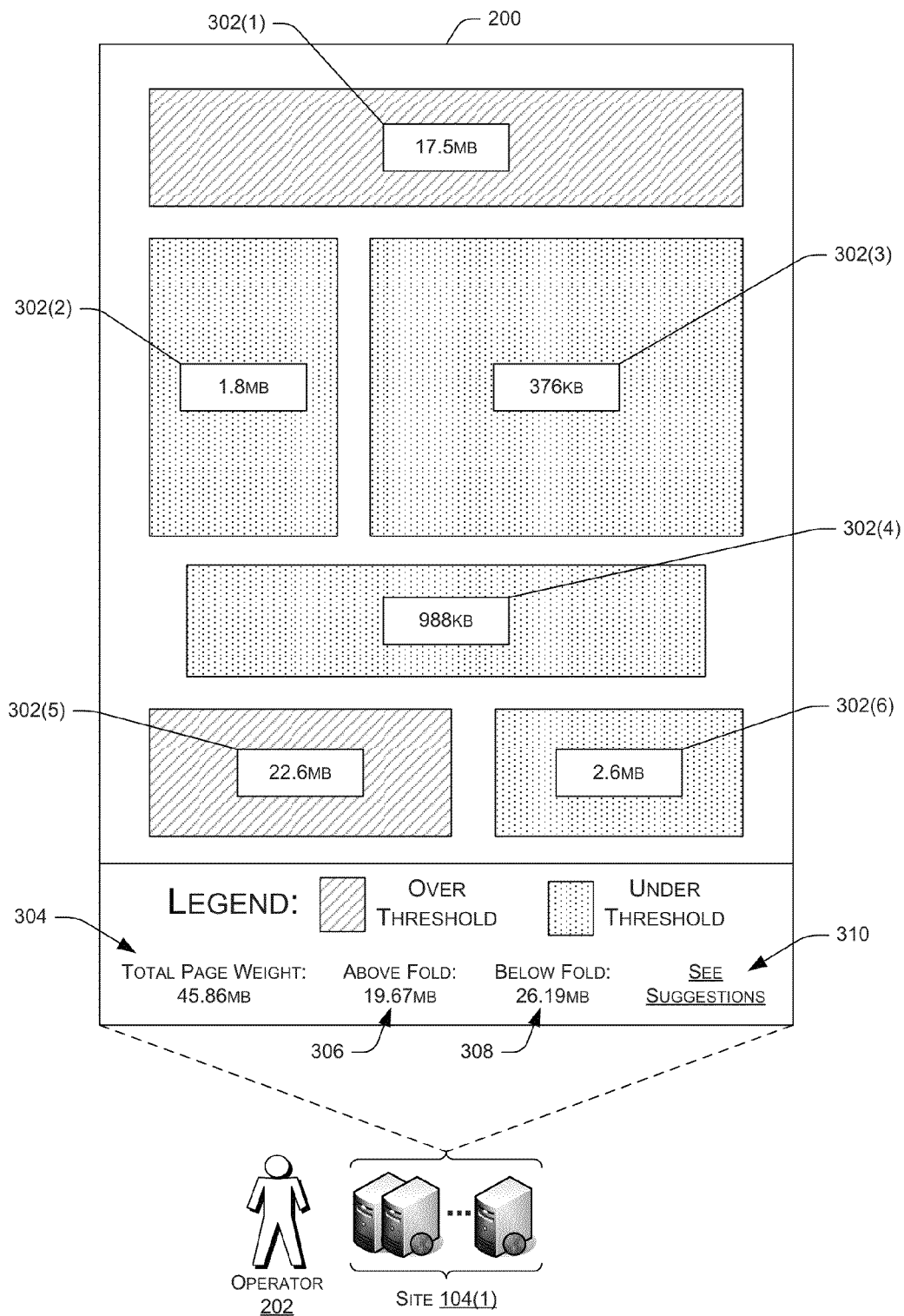
FIG. 3 is another screen rendering of the example UI from FIG. 2. Here, the UI specifies the weight associated with each slot of the UI, as well as a cumulative "above-the-fold" weight, a cumulative "below-the-fold" weight, and a selectable icon that allows an operator of the site to view one or more suggestions for decreasing a weight and/or latency of the example UI.

FIG. 3 is another screen rendering of the example UI 200. In this example, the UI 200 includes the legend described with reference to FIG. 2, while also specifying particular weights associated with each slot of the UI 200. For instance, the UI 200 indicates that the slot 204(1) has a weight 302(1) of 17.5 megabytes, the slot 204(2) has a weight 302(2) of 376 kilobytes, and so forth.

In addition, in this example the UI 200 includes a total weight of the page 304, a cumulative "above-the-fold" weight of the page 306, and a cumulative "below-the-fold" weight of the page 308. With this additional information provided by the site-performance toolkit 116, the operator 202 is able to make even better decisions regarding potential modifications of the features and content on the UI 200. In addition, the example UI 200 includes a selectable icon 310, entitled "see suggestions", that allows the operator 202 to view one or more suggestions for decreasing a weight and/or latency of the example UI 200.

Figure 4:
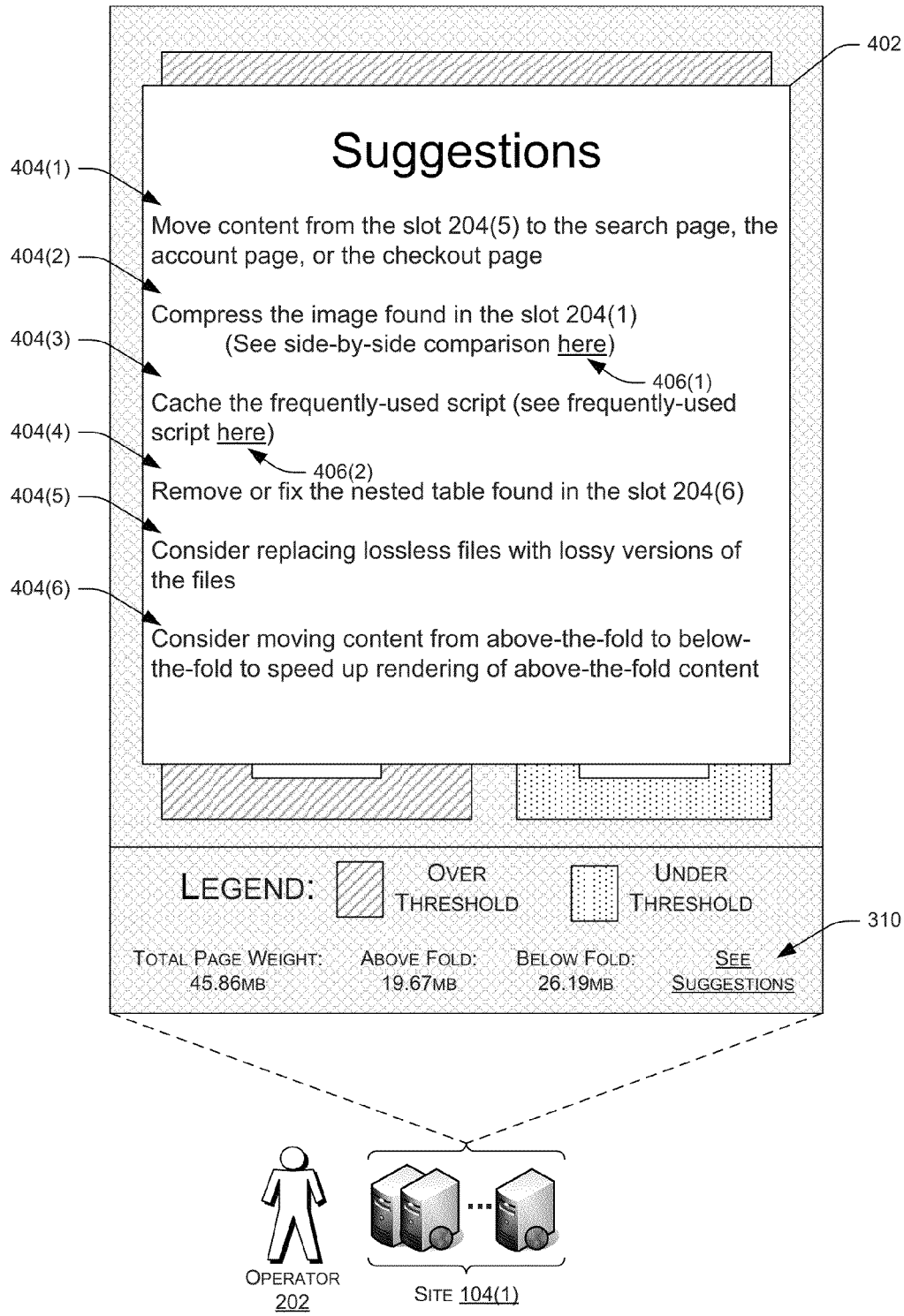
FIG. 4 is a screen rendering of an example UI after the operator selects the suggestions icon from FIG. 3. As illustrated, the site-performance toolkit serves a menu that includes one or more suggestions for decreasing the weight and/or latency of the example UI from FIG. 3.

FIG. 4 is a screen rendering of an example UI 200 after the operator selects the suggestions icon 310 from FIG. 3. As illustrated, the site-performance toolkit 116 serves a menu 402 that includes suggestions 404(1), 404(2), . . . , 404(6) for decreasing the weight and/or latency of the example UI 200 from FIG. 3. These example suggestions 404(1)-(6) include:

moving a relatively large feature or chunk of content from the slot 204(5) to another page (e.g., a search page, an account page, or a checkout page) that is relatively lighter than the page associated with the UI;
  compressing the image found in the slot 204(1);
  caching a script that has been identified by the toolkit 116 as being frequently used and frequently reloaded;
  removing or fixing the nested table found in the slot 204(6);
  replacing lossless files with lossy versions of the files; and
  moving content from above-the-fold to below-the-fold to speed up rendering of the above-the-fold content.

In addition, some of these suggestions may allow the operator 202 to view a simulation of the suggested change and/or may allow the operator to actually make this change. The suggestion 404(2), for instance, includes a selectable icon 406(1) that allows the operator 202 view a side-by-side comparison of the current image and a compressed image in accordance with the suggestion 404(2). The suggestion 404(3), meanwhile, includes a selectable icon 406(2) that allows the operator 202 to view the identified frequently-used script, which may help the operator 202 decide whether or not to cache this script.

Figure 5:
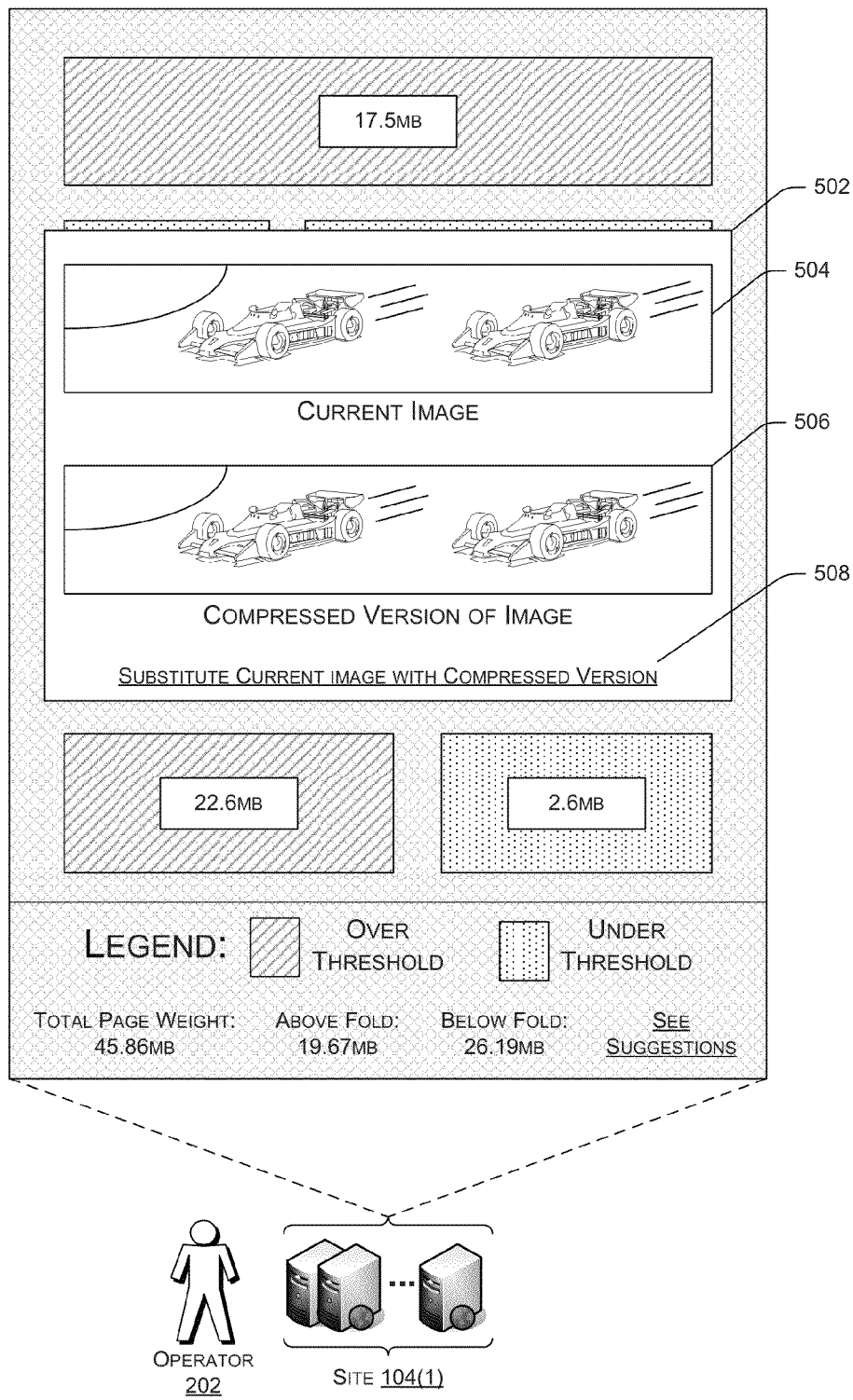
FIG. 5 is a screen rendering of an example UI after the user selects to view an implemented suggestion from the menu of FIG. 4.

FIG. 5 is a screen rendering of the example UI of FIG. 4 after the user selects the icon 406(1). In response, the toolkit 116 presents a menu 502 that illustrates the current image 504 found within the slot 204(1), as well as a compressed version 506 of the image. By presenting this side-by-side comparison to the operator 202, the toolkit 116 helps the operator 202 to decide whether the weight or latency saved by using the compressed version 506 of the image is worth the tradeoff in terms of image quality. If the operator 202 decides that the tradeoff is in fact worth it, then the operator 202 may select an icon 508. In response to receiving an indication that the operator 202 has selected the icon 508, the toolkit 116 may automatically substitute the current image 504 with the compressed version 506 of the image on behalf of the operator 202.

Figure 6:
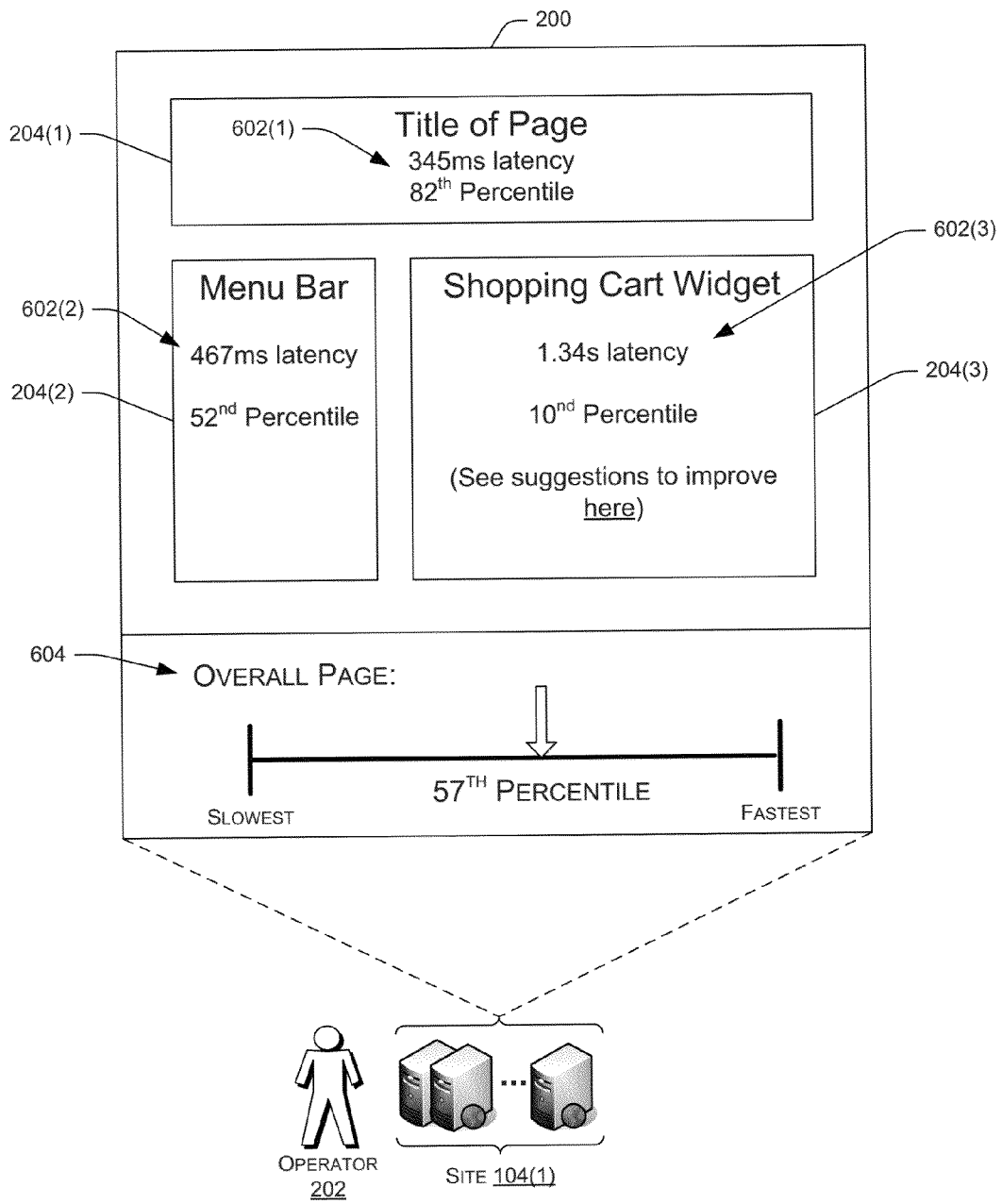
FIG. 6 is a screen rendering of the example UI of FIG. 2 that illustrates, on a per-slot basis, how the latency associated with each feature of each slot compares to corresponding latencies of other sites. This UI also illustrates how latency associated with the entire UI (here, a webpage) compares with latencies for corresponding pages of other sites.

FIG. 6 is a screen rendering of the example UI 200 that illustrates, on a per-slot basis, how the latency associated with each feature of each slot compares to corresponding latencies of other sites. This UI 200 also illustrates how latency associated with the entire UI (here, a webpage) compares with latencies for corresponding pages of other sites.

In some instances, measuring and comparing latencies of sites may comprise measuring and comparing mean latencies, median latencies, distributions of latencies, portions of distributions of latencies, or the like. As is known, latencies associated with a particular site (or a portion of a site) may vary from request to request, since this latency depends on a variety of factors. These factors include a latency of serving the content from the site, latencies of networks between the site and the requestor, a performance of the requesting computing device, a current load of requests at the site, and a variety of other factors. As such, measuring a site's latency may include making multiple requests to create a latency distribution for a site and comparing latencies based on this distribution. Therefore, as used herein, measuring latencies and comparing latencies between sites may include measuring and comparing mean latencies, median latencies, full distributions of latencies, portions of distributions of latencies (e.g., the slowest or fastest 10% of the distributions), and/or the like.

Returning to the example of FIG. 2, the example UI 200 first illustrates that the slot 204(1) comprises a title of the page. In addition, the UI 200 illustrates statistics 602(1) associated with this slot, such as an (average) amount of time needed to render the title of the page, as well as a percentile indicating how this latency performance compares within one or more other sites. Here, the statistics 602(1) indicate that the title of the page typically renders within the slot 204(1) in 345 milliseconds, placing the site 104(1) in the $82^{nd}$ percentile when it comes to performance of rendering the title of the page. That is, the statistics 602(1) indicate that the site 104(1) is better than 82% of the benchmarked sites when it comes to rendering the title of this particular category of page (here, a "welcome page").

In addition, the UI 200 illustrates that the slot 204(2) includes a menu bar that includes numerous in-site links to allow users of the site 104(1) to navigate the site. Here, the statistics 602(2) indicate that the site 104(1) typically takes 467 milliseconds to render this menu bar, placing this site 104(1) in the $52^{nd}$ percentile for rendering menus. In addition, the UI 200 illustrates that the slot 204(3) includes a shopping-cart widget associated with statistics 602(3). These statistics 602(3) indicate that the shopping-cart widget typically takes 1.34 seconds to fully render. This places the site in the $10^{th}$ percentile of shopping-cart performance as compared to the benchmarked sites. In addition, the UI 200 here includes a selectable icon that allows the operator 202 to view one or more suggestions regarding how to improve this latency performance of the shopping-cart widget. In some instances, the toolkit 116 may surface this type of suggestion icon in response to identifying a feature having a ranking or percentile that is below a certain threshold score.

Finally, the UI 200 includes an indication 604 regarding how the overall illustrated page of the site 104(1) compares to other corresponding pages of other sites. For instance, the UI 200 may represent a welcome page of the site, so the indication 604 may indicate how the welcome page of the site 104(1) compares to welcome pages of one or more other sites. In some instances, the operator 202 is able to select the sites to which the illustrated UI 200 compares against, as described in detail below. In the illustrated example, the indication 604 indicates that the current page of the site 104(1) is in the $52^{nd}$ percentile in terms of latency performance as compared to corresponding pages of the identified competitors or other sites.

Figure 7:
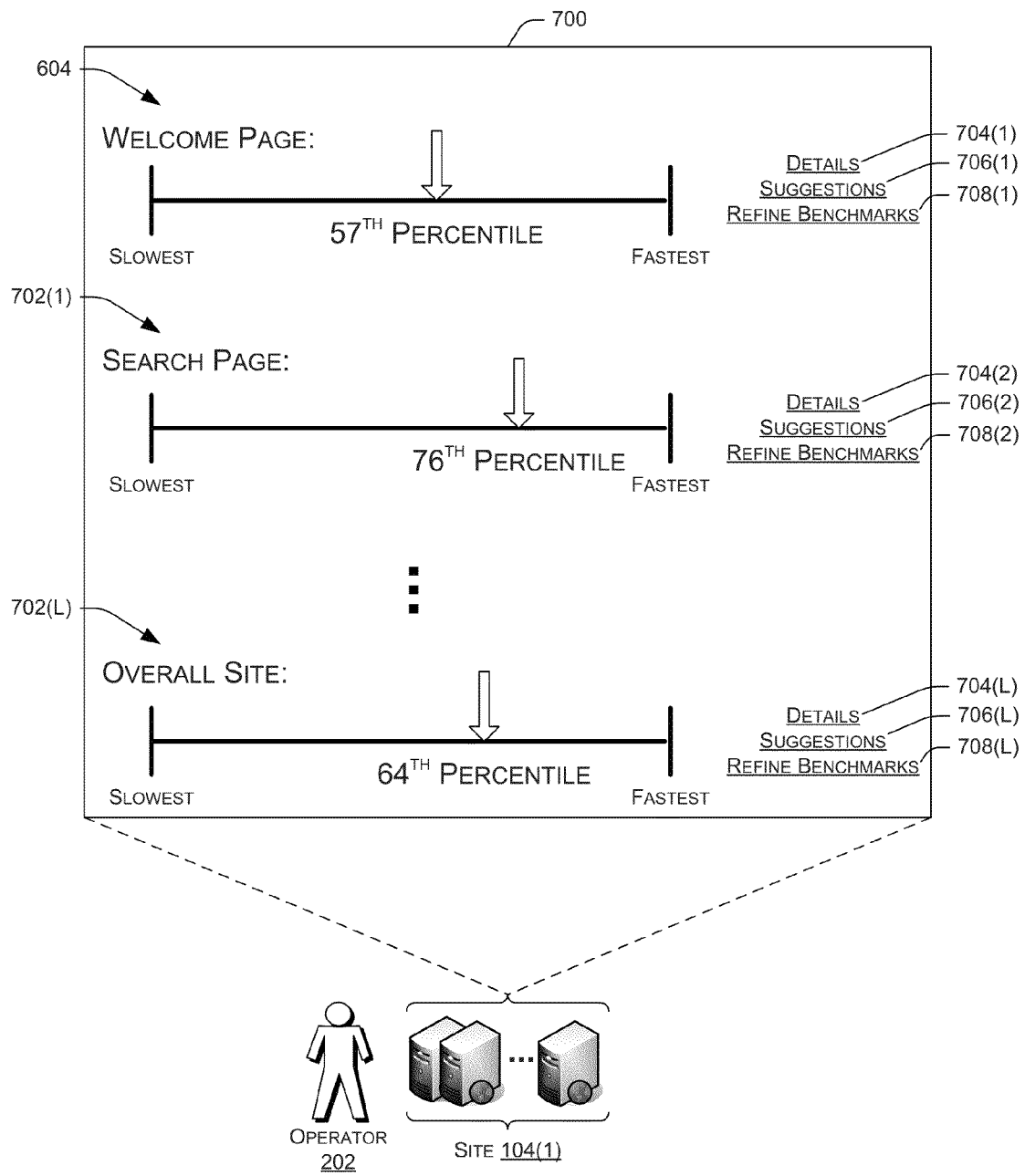
FIG. 7 is a screen rendering of an example UI that illustrates, on a per-page basis, how the latency of pages of the site compares to corresponding pages of other sites. This UI also illustrates how an overall latency of the site compares to the other sites.

FIG. 7 is a screen rendering of an example UI 700 that illustrates, on a per-page basis, how the latency of pages of the site compares to corresponding pages of other sites. This UI also illustrates how an overall latency of the site compares to the other sites.

In this example, the UI 700 includes the indication 604 described above with reference to FIG. 6, as well as an indication 702(1) of how a search page of the site 104(1) compares to search pages of one or more other sites, and an indication 702(L) of how the overall latency performance of the site 104(1) compares to the overall latency performance of the other sites. Here, for instance, the UI 700 indicates that the performance of the welcome page is in the $57^{th}$ percentile as described above, the search page is in the $76^{th}$ percentile, and the overall site is in the $64^{th}$ percentile. While this example UI 700 illustrates a few comparisons, other example UIs may compare numerous other page types to the other sites, such as checkout pages, account pages, help pages, and the like.

In addition, this example UI 700 includes selectable icons adjacent to each of the indications. For instance, the UI 700 includes selectable icons 704(1), 704(2), . . . , 704(L) that allows the operator 202 to view details regarding the measured latency comparisons, selectable icons 706(1), 706(2), . . . , 706(L) that allows the operator 202 to view suggestions on how to improve the measured latency performance of the different portions of the site, and selectable icons 708(1), 708(2), . . . , 708(L) that allows the operator 202 to "refine [the] benchmarks" to which the site 104(1) is currently being compared. For instance, selection of one of the icons 708(1)-(L) may allow the operator 202 to select one or more competitor sites to compare against.

Figure 8:
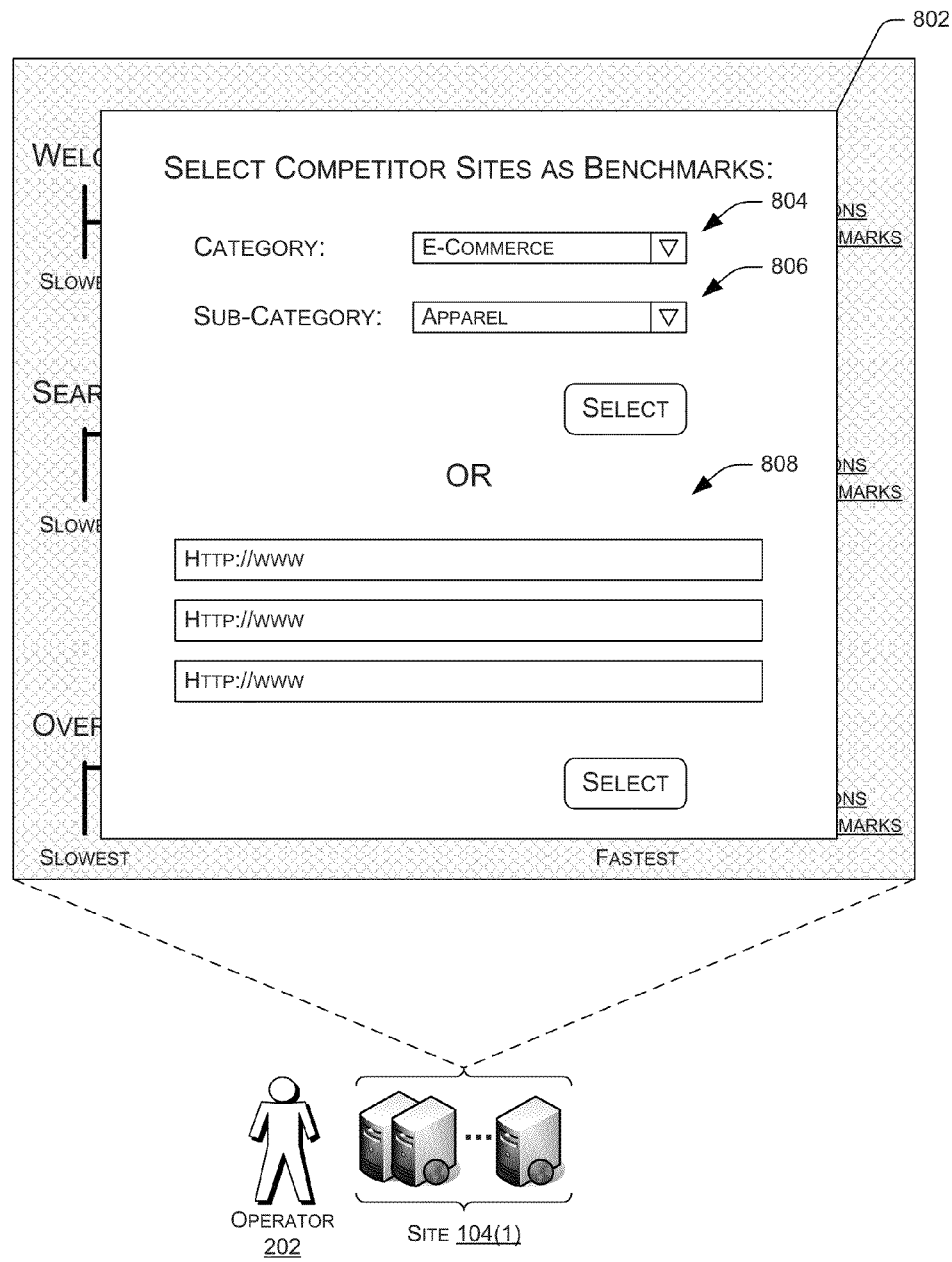
FIG. 8 is a screen rendering of an example UI that allows an operator of the site to select one or more sites to use as benchmarks for comparison.

FIG. 8 is a screen rendering of a menu 802 that the toolkit 116 may present in response to the operator 202 of the site 104(1) selecting one of the icons 708(1)-(L) (here, the icon 708(1)). This menu 802 allows the operator 202 to select one or more sites to which to compare the subject site 104(1) against. In this example, the menu 802 allows the operator to specify the other sites based on a category 804 and/or a subcategory 806. In addition or in the alternative, the menu 802 may allow the operator 202 to identify individual sites by entering respective URL addresses into text boxes 808. Of course, while a few examples have been given, it is to be appreciated that the operator 202 may identify these sites in any other manner.

Figure 9:
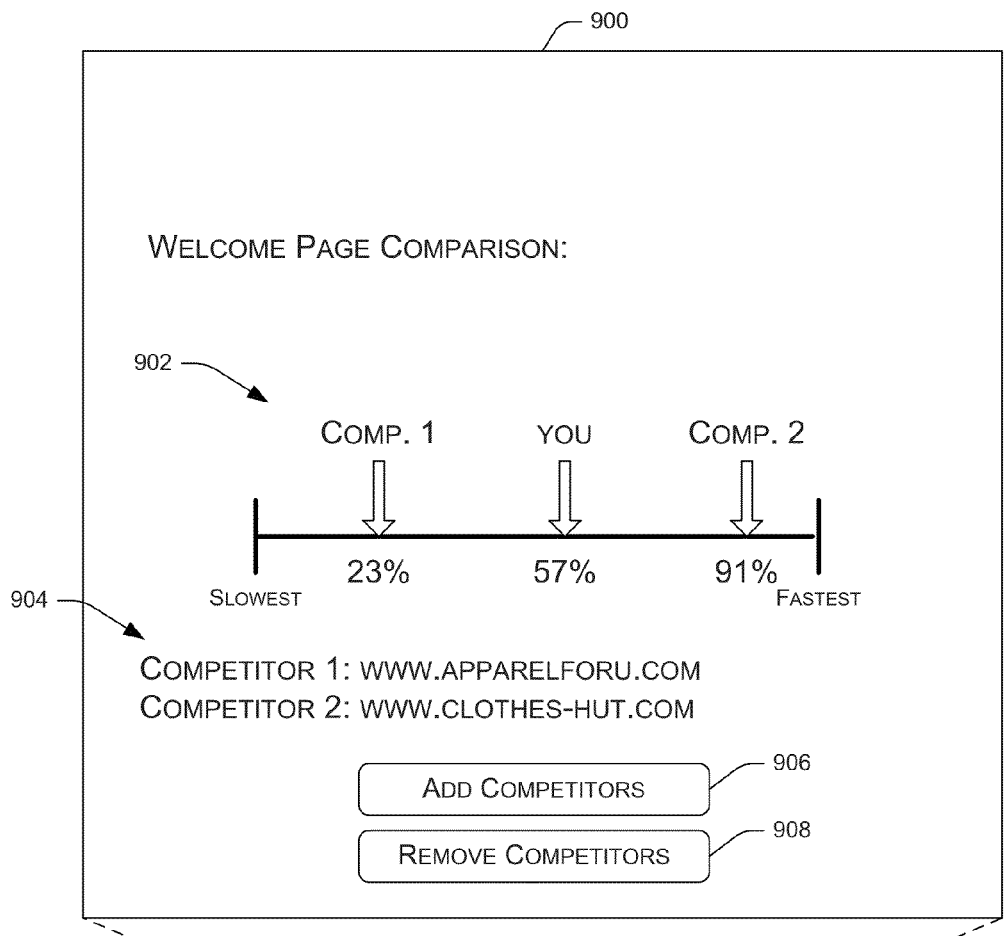
FIG. 9 is a screen rendering of an example UI showing how a particular page of the site compares to corresponding pages of two example sites selected as benchmarks by an operator of the site using the UI of FIG. 8.

FIG. 9 is a screen rendering of an example UI 900 after the operator 202 has identified two different competitor sites to compare the site 104(1) against. More specifically, the operator 202 has requested to compare the welcome page of the site 104(1) with welcome pages associated with two example competitors. The operator 202 may have reached this UI 900 by selecting the icon 708(1) and identifying the two competitors in any way, such as via the menu 802 or otherwise.

Here, the UI 900 includes an indication 902 of how the welcome page of the site 104(1) compares to the two selected competitors. As illustrated, the welcome page of the site 104(1) is in the $57^{th}$ percentile of all welcome pages (e.g., within a particular category), while the first competitor is in the $23^{rd}$ percentile and the second competitor is in the $91^{st}$ percentile. In addition, the UI 900 includes an identification 904 of the two competitors, an icon 906 that allows the operator to add additional competitors for the purpose of viewing latency performance for these competitors, and an icon 908 that allows the operator 202 to remove one or more competitors from the illustrated UI 900.

Furthermore, in some instances, either or both of the indication 902 or the identification 904 may comprise a link to the welcome pages of the respective competitors. As such, the operator 202 is able to immediately navigate to the welcome pages of the respective competitors while viewing the comparison of FIG. 9.

Figure 10:
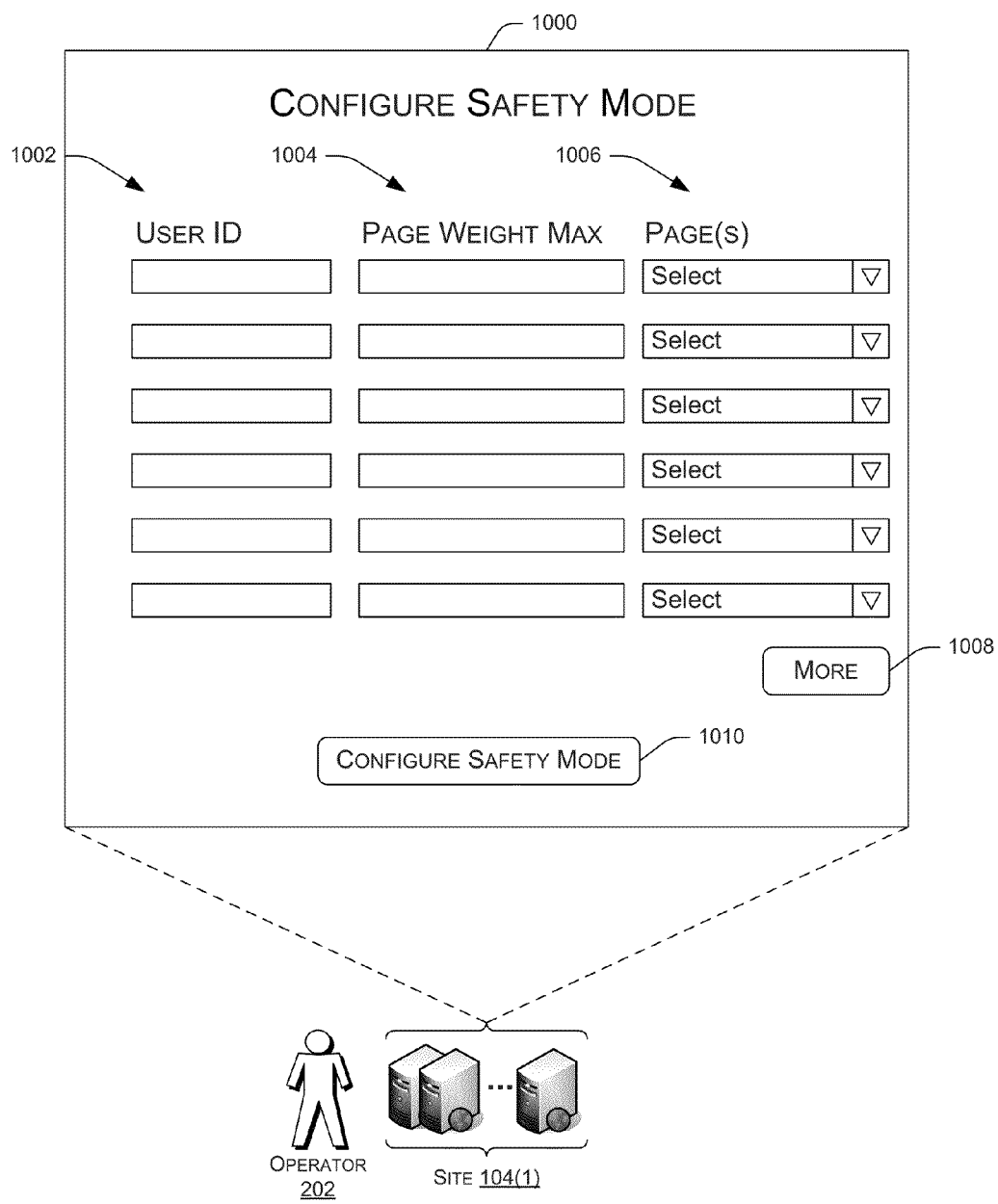
FIGS. 10-11 are screen renderings of an example UI that allows an operator of a site to configure a safety mode on a per-user and/or per-page basis. Here, the operator is able to specify, for a particular user who is also an operator of the site, a maximum page weight that this user is able to deploy. By setting such a limit, the operator ensures that this user is unable to drastically slow down the site by deploying a page having a page weight that is greater than the specified maximum.
Figure 11:
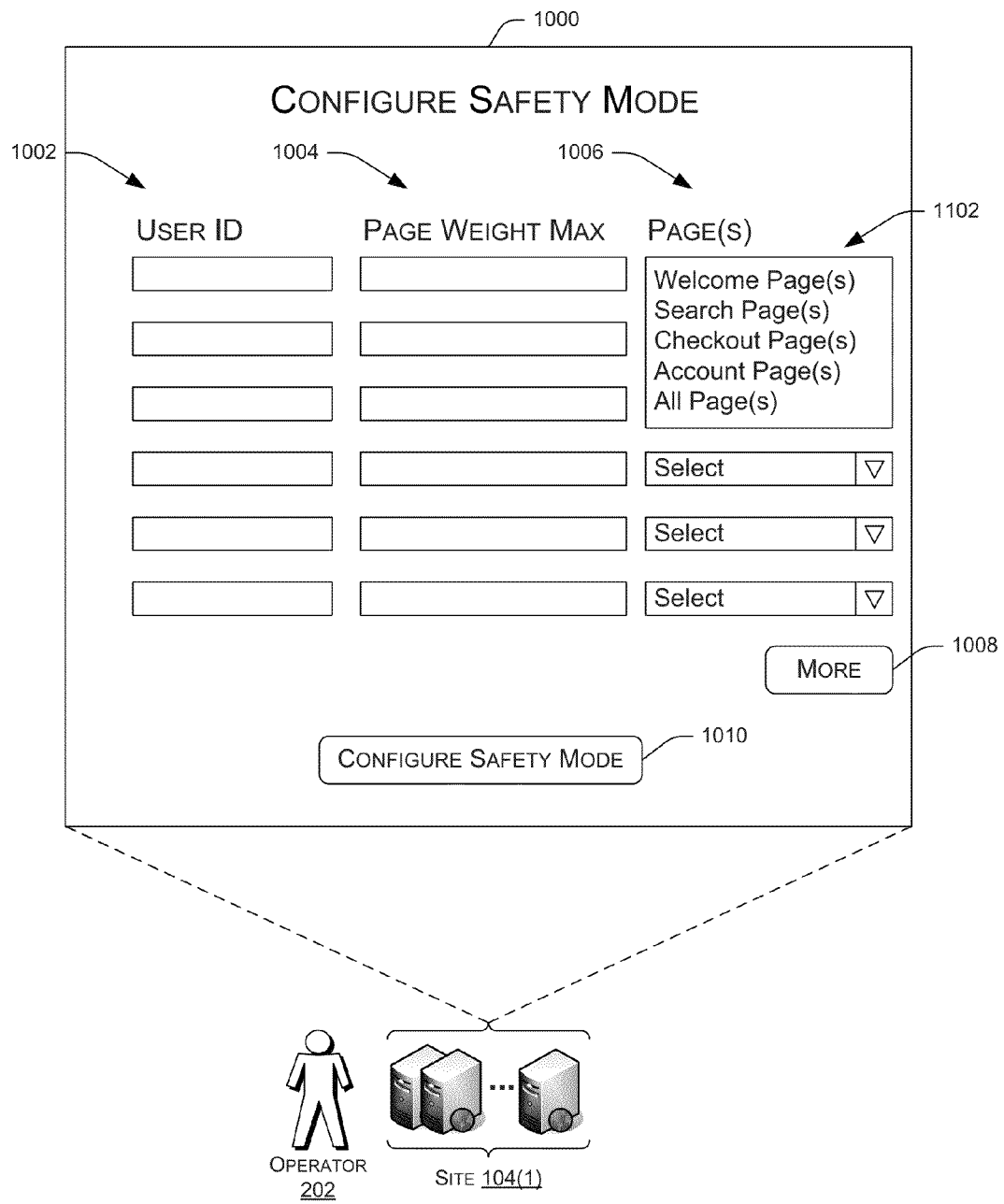

FIGS. 10-11 are screen renderings of an example UI 1000 that allows the operator 202 of the site 104(1) to configure a safety mode on a per-user and/or per-page basis. Here, the operator is able to specify, for a particular user who is also an operator of the site, a maximum page weight that this user is able to deploy. By setting such a limit, the operator ensures that this user is unable to drastically slow down the site by deploying a page having a page weight that is greater than the specified maximum.

As illustrated, the UI 1000 includes a column 1002 that allows the operator 202 to identify one or more users for which to configure the safety mode. The operator 202 may identify one or more users in a variety of ways. In the illustrated example, for instance, the operator 202 may identify users by their explicit user identifiers (e.g., via user names, user aliases, etc.). In other instances, meanwhile, the operator 202 may identify users by user roles, by user permissions, or in any other way.

For example, the operator may identify users based on roles in some instances. Example roles may include "web developer", "website editor", "sales team member", marketing team member", and the like. Here, the operator 202 could configure different safety modes for different roles. For instance, any user that has a defined role of "web developer" may be allowed to launch pages having a relatively large latency or page weight. Users that have the role of "sales team member", meanwhile, may only be able to deploy pages having small latencies or page weights (or may not be able to deploy pages at all).

In still other instances, the operator 202 may identify users based on their permission level. For instances, any user having a large or complete set of permissions to access and alter the site may be allowed to launch pages having relatively large latencies or page weights. Users having a relatively small number of permissions, meanwhile, may only be allowed to launch pages having relatively small latencies or page weights.

Returning to FIG. 10, the UI 1000 also includes a column 1004 for the operator 202 to specify a maximum page weight, and a column 1006 that allows the operator 202 to select which pages to apply the safety mode to. In addition, the UI 700 includes an icon 1008 ("more") to allow the operator 202 to set up safety mode for additional users if need be, as well as an icon 1010 that is selectable by the operator 202 to configure the safety mode after the operator 202 provides the information into the columns described above.

FIG. 11 illustrates the UI 1000 after the operator 202 selects a drop-down menu 1102 shown in the example column 1006. As illustrated, the operator 202 is able to set the safety mode for a set of one or more pages, and/or for the entire site as a whole (i.e., "all pages"). After setting up a safety mode for a user with use of the UIs of FIGS. 10-11, the toolkit 116 will ensure that the user is unable to deploy a page that exceeds the maximum page weight if the page is under the authority of the safety mode configured by the operator 202.

Figure 12:
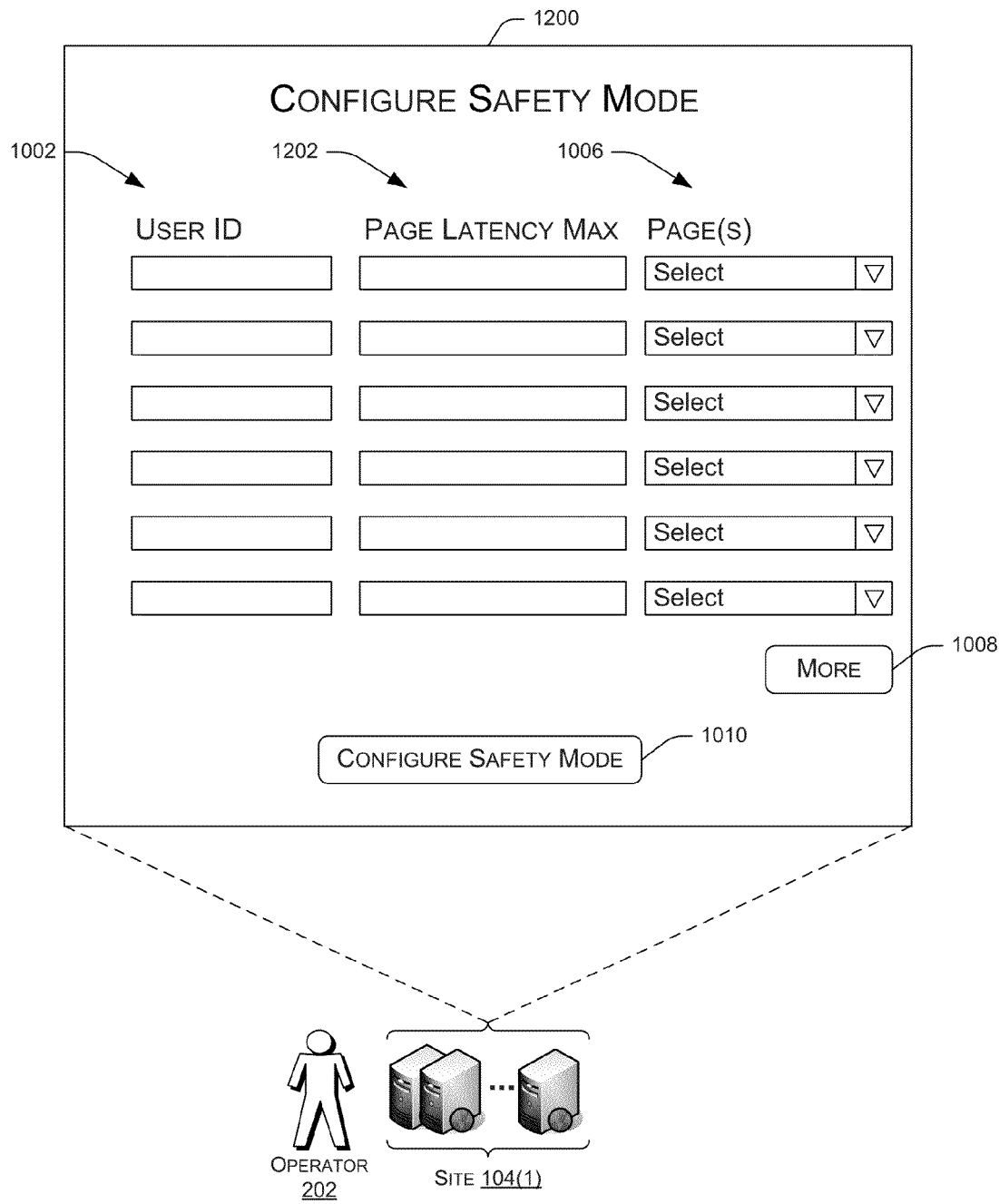
FIGS. 12-13 are screen renderings of another example UI that allows an operator of the site to configure a safety mode on a per-user and/or per-page basis. Here, the operator is able to specify, for a particular user who is also an operator of the site, a maximum latency for a page that this user is able to deploy. Again, this ensures that this user is unable to drastically slow down the site by deploying a page having an associated latency that is greater than the specified maximum.
Figure 13:
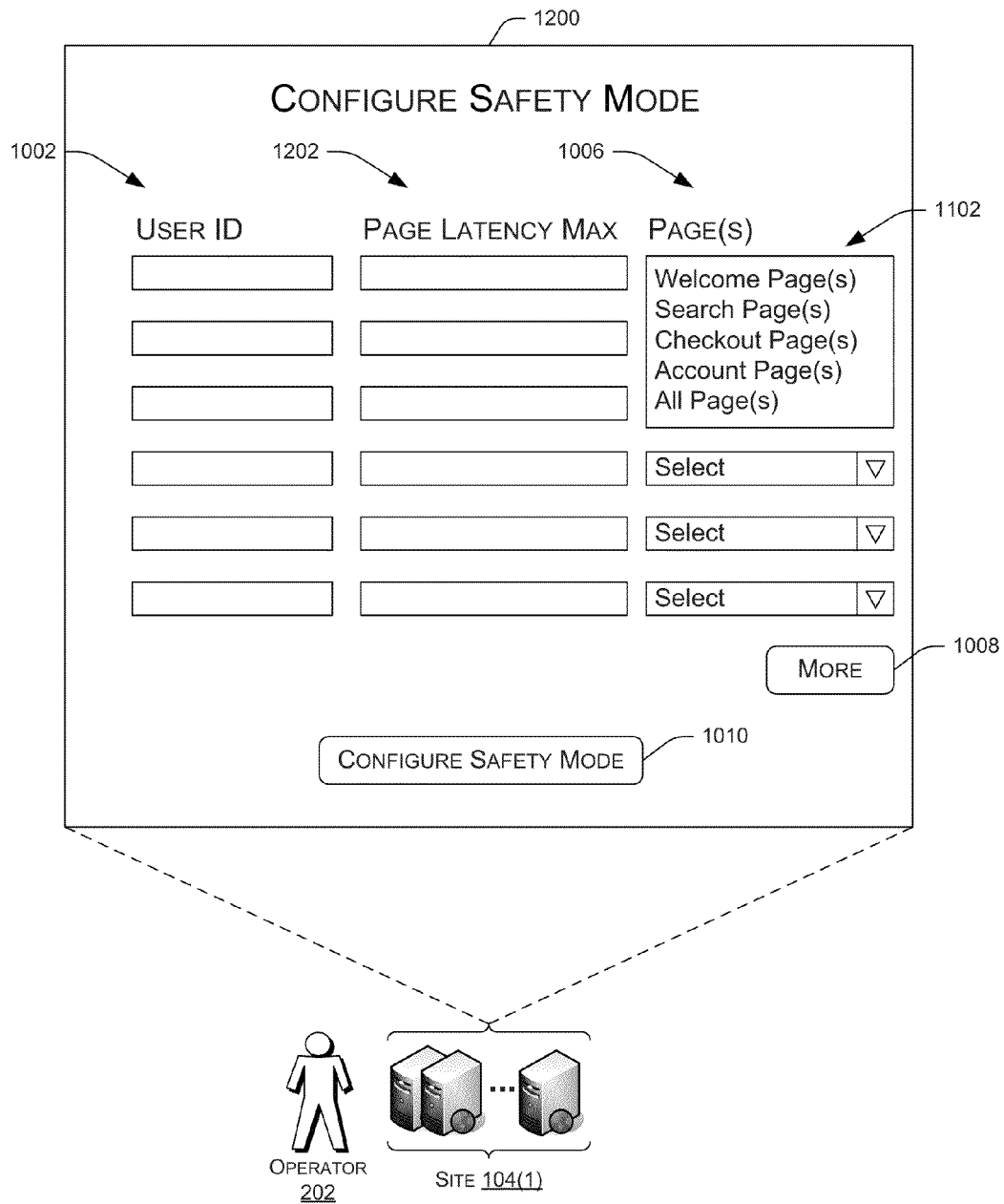

FIGS. 12-13 are screen renderings of another example UI 1200 that allows the operator 202 of the site 104(1) to configure a safety mode on a per-user and/or per-page basis. Here, the operator 202 is able to specify, in a column 1202 and for a particular user who is also an operator of the site, a maximum latency for a page that this user is able to deploy. Again, this ensures that this user is unable to drastically slow down the site by deploying a page having an associated latency that is greater than the specified maximum.

FIG. 13 illustrates the UI 1200 of FIG. 12 after the operator selects the drop-down menu 1102 shown in the column 1006. Again, in response the operator 202 is able to select which one or more pages to which to apply the maximum page latency. After setting up a safety mode for a user with use of the UIs of FIGS. 12-13, the toolkit 116 will ensure that the user is unable to deploy a page that exceeds the maximum latency if the page is under the authority of the safety mode configured by the operator 202.

Figure 14:
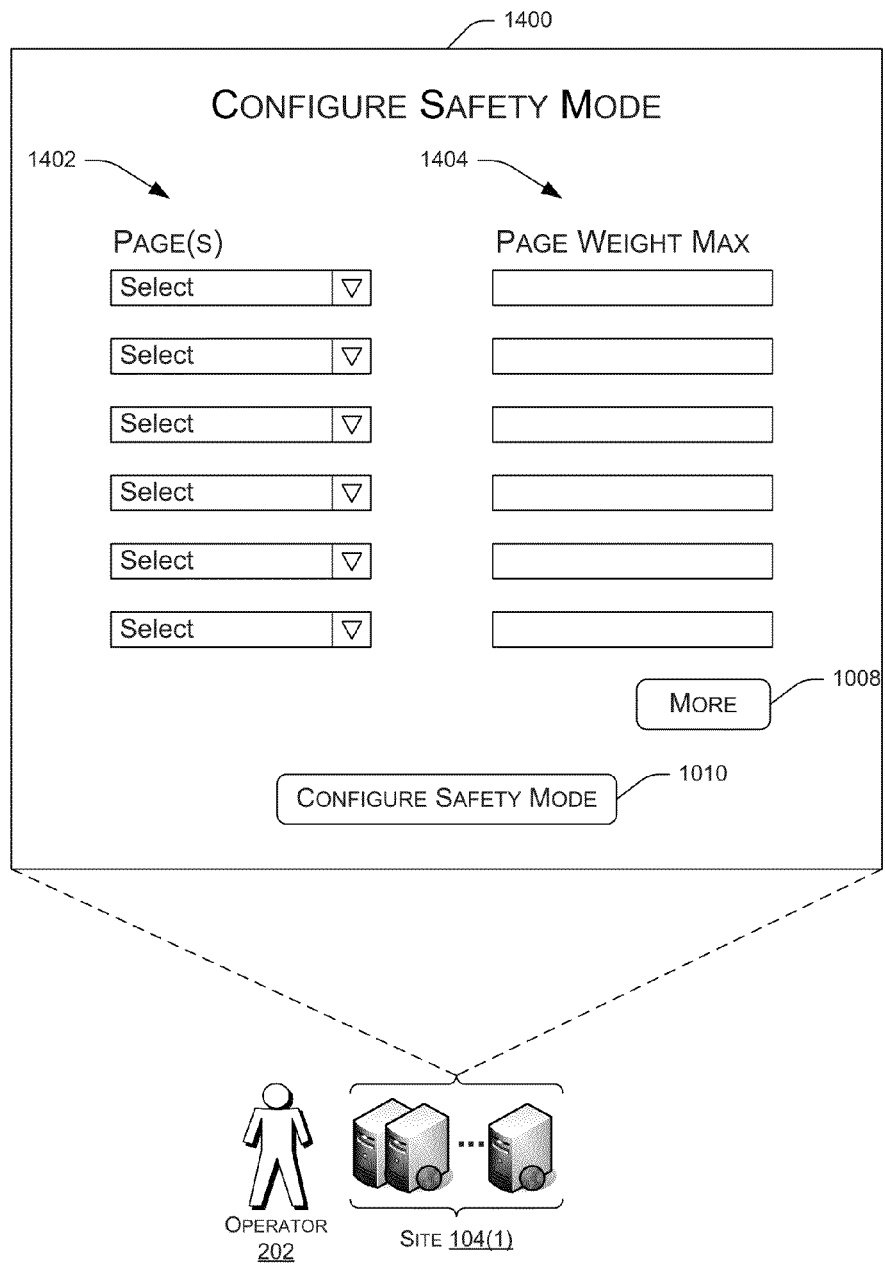
FIG. 14 is a screen rendering of another example UI that allows an operator of the site to configure a safety mode on a per-page basis. Here, the operator is able to set a maximum page weight for a page, such that a page having a weight greater than the maximum may not be deployed.

FIG. 14 is a screen rendering of another example UI 1400 that allows the operator 202 of the site 104(1) to configure a safety mode on a per-page basis. Here, the UI 1400 includes a column 1402 that allows the operator 202 to select one or more pages to which to apply the safety mode, and a column 1404 that allows the operator 202 to set a maximum page weight for a page, such that a page having a weight greater than the maximum may not be deployed. In this example, the toolkit 116 may ensure that no page that is under the authority of this configured safety mode and that exceeds the maximum page weight is deployed, regardless of the identity of the user who makes the request.

Figure 15:
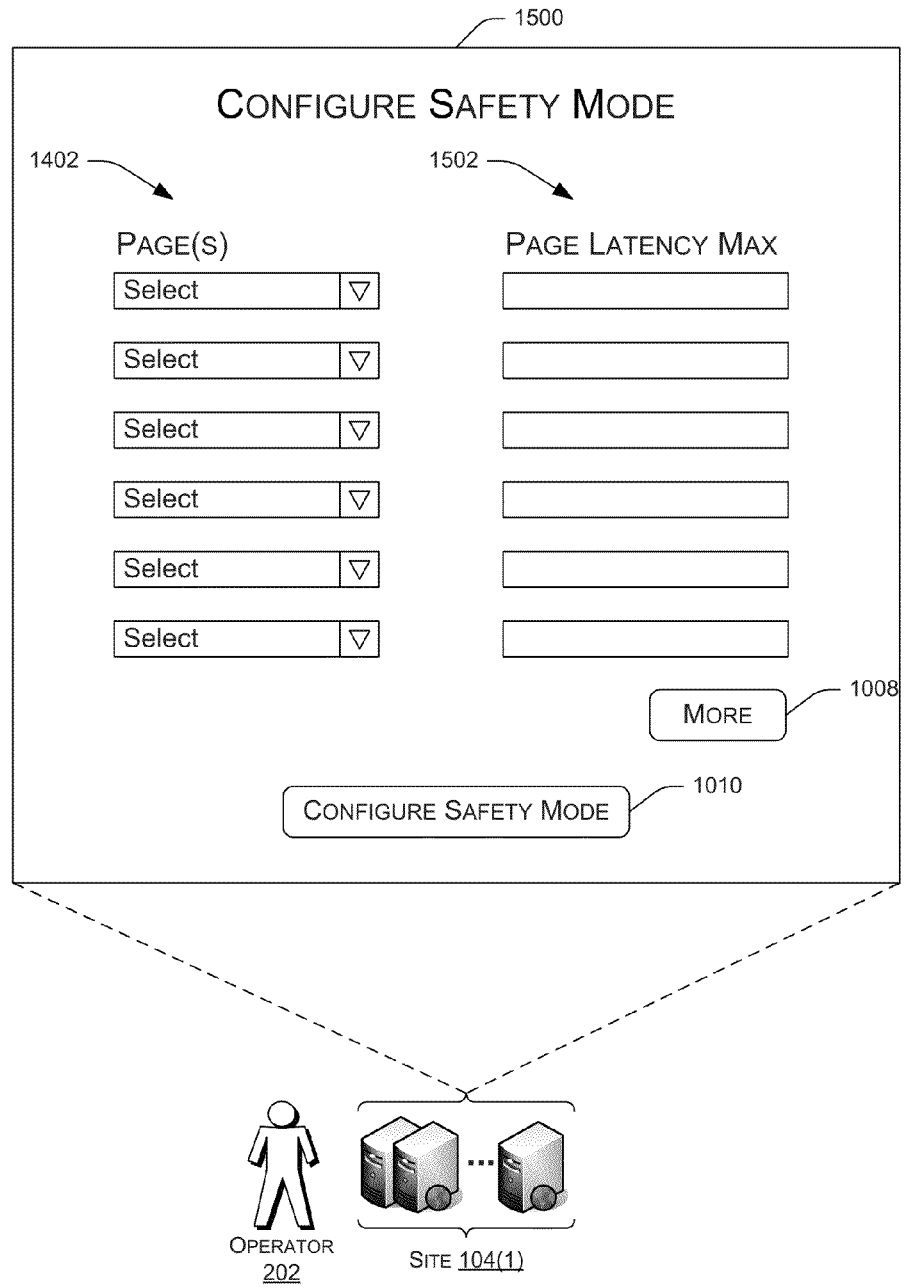
FIG. 15 is a screen rendering of yet another example UI that allows an operator of the site to configure a safety mode on a per-page basis. Here, the operator is able to set a maximum latency for a page, such that a page having an associated latency greater than the maximum may not be deployed.

FIG. 15 is a screen rendering of yet another example UI 1500 that allows the operator 202 of the site 104(1) to configure a safety mode on a per-page basis. Here, the operator is able to set (via a column 1502) a maximum latency for a page, such that a page having an associated latency greater than the maximum may not be deployed. Again, the toolkit 116 may ensure that no page that is under the authority of this configured safety mode and that exceeds the maximum page weight is deployed, regardless of the identity of the user who makes the request.

Example Processes

Figure 16:
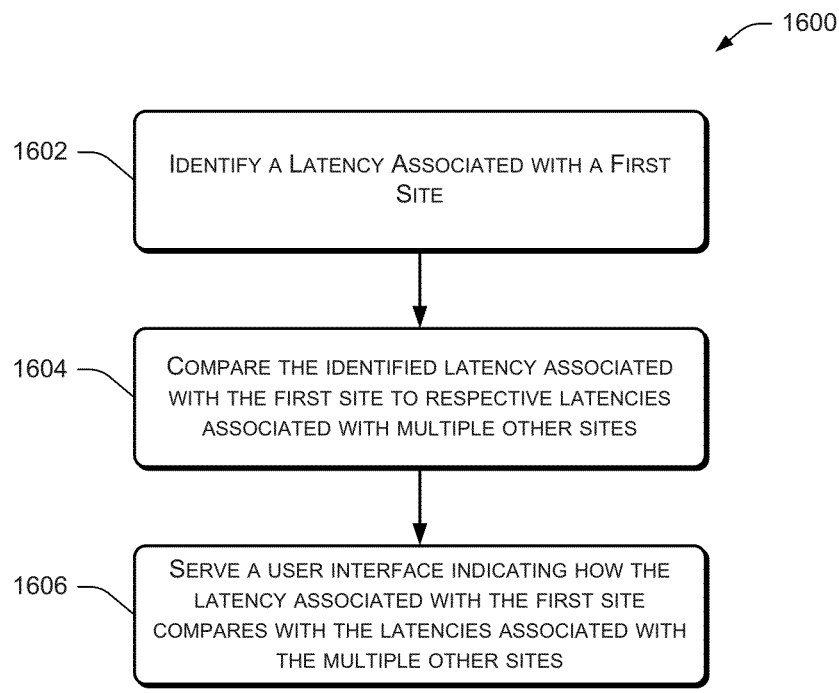
FIG. 16 is a flow diagram of an example process for serving a user interface indicating how a latency associated with a first site compares with one or more other sites.
Figure 17:
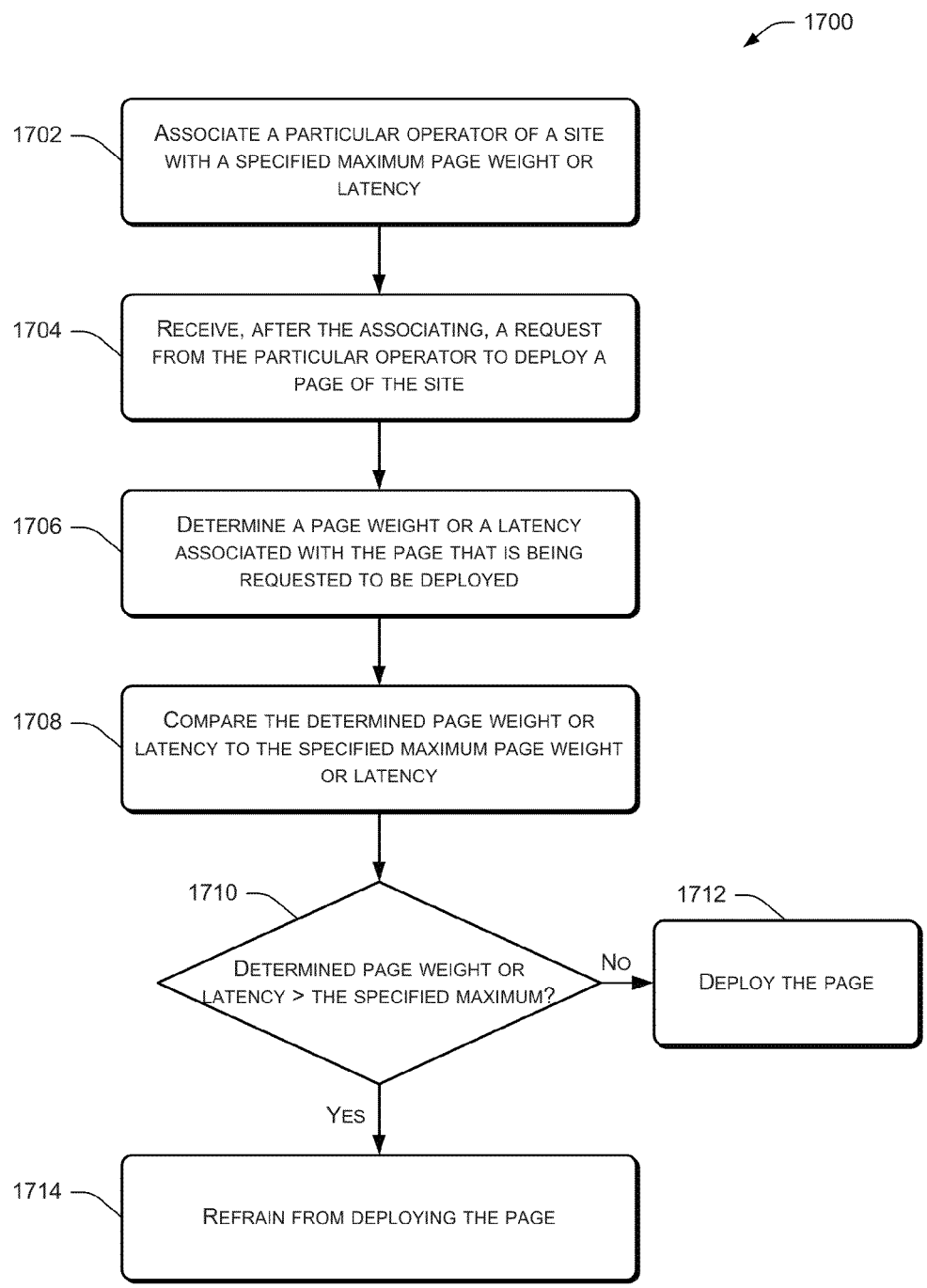
FIG. 17 is a flow diagram of an example process for configuring and implementing a safety mode, such that a particular user may not deploy a page that is greater than a predefined maximum page weight or latency.
Figure 18:
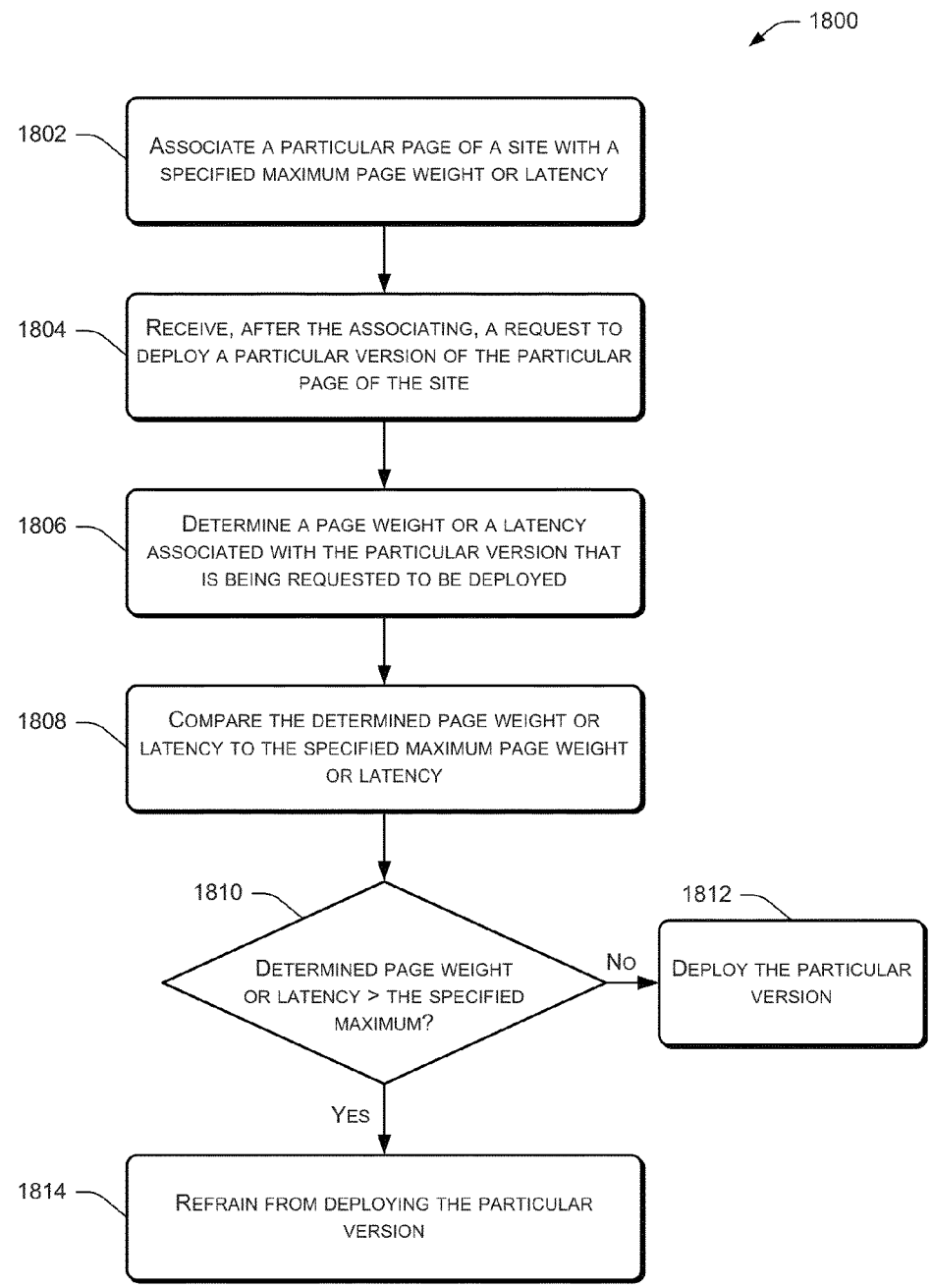
FIG. 18 is a flow diagram of another example process for configuring and implementing a safety mode, such that a particular version of a page may not be deployed when the page weight or latency of the version is greater than a predefined maximum page weight or latency.

FIGS. 16-18 are flow diagrams of example processes 1600, 1700, and 1800 for implementing the tools to improve site performance described herein. Each of these processes is illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process.

The process 1600 includes, at an operation 1602, identifying a latency associated with a first site. This may be for a portion of the site, for the site as the whole, or the like. An operation 1604 then compares the identified latency associated with the first site to respective latencies associated with multiple other sites. Finally, an operation 1606 serves a user interface indicating how the latency associated with the first site compares with the latencies associated with the multiple other sites.

FIG. 17 illustrates the process 1700 and includes, at an operation 1702, associating a particular operator of a site with a specified maximum page weight or latency. An operation 1704 then receives, after the associating, a request from the particular operator to deploy a page of the site. Next, an operation 1706 determines a page weight or a latency associated with the page that is being requested to be deployed. An operation 1708 then compares the determined page weight or latency to the specified maximum page weight or latency.

A decision block 1710 then determines whether the determined page weight or latency is greater than the specified maximum. If not, then an operation 1712 deploys the page. If, however, the determined page weight or latency is greater than the specified maximum, then an operation 1714 refrains from deploying the page.

FIG. 18 illustrates the process 1800 and includes, at an operation 1802, associating a particular page of a site with a specified maximum page weight or latency. This page may be identified by a particular address (e.g., a uniform resource locator (URL), etc.), or by a particular category of pages that includes the particular page. An operation 1804 then receives, after the associating, a request to deploy a particular version of the particular page of the site. Next, an operation 1806 determines a page weight or a latency associated with the particular version that is being requested to be deployed.

Thereafter, an operation 1808 compares the determined page weight or latency to the specified maximum page weight or latency. A decision block 1810 then determines whether the determined page weight or latency is greater than the specified maximum. If not, then an operation 1812 deploys the particular version of the page. If, however, the determined page weight or latency is greater than the specified maximum, then an operation 1814 refrains from deploying the particular version of the page.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. One or more computing devices comprising:
   one or more processors;
   memory; and
   a site-performance toolkit, stored in the memory and executable on the one or more processors to provide feedback to an operator of a site, the site-performance toolkit, comprising:
      a weight calculator to calculate a weight of at least a portion of the site and to provide the calculated weight to the operator of the site;
      a latency calculator to simulate one or more requests for a page of the site, to calculate a latency to render content of the page based at least in part on the one or more requests, wherein:
         the content comprises a plurality of features,
         the page of the site comprises a plurality of discrete areas, wherein at least one feature of the plurality of features is to be rendered within a respective area of the plurality of areas, and
         the calculated latency comprises respective latencies for each area of the plurality of areas,
      to provide at least one latency of the respective latencies to the operator of the site by displaying the at least one latency within a particular area of the plurality of areas to which the at least one latency corresponds, to compare the at least one latency to an additional latency associated with an additional area of at least one additional site identified by the operator, wherein the additional area corresponds to the particular area, to generate a percentile indicative of the comparison, and to display the percentile, together with the at least one latency, within the particular area; and
      a suggestion component to provide one or more suggestions to the operator of the site to reduce the calculated weight or the calculated latency.

2. One or more computing devices as recited in claim 1, wherein the one or more suggestions provided by the suggestion component comprise:
   a suggestion to compress an image on the site;
   a suggestion to reduce a number of images on a particular page of the site;
   a suggestion to move content from a first portion of the site having a relatively large weight to a second portion of the site having a relatively small weight;
   a suggestion to cache a script that is frequently used on the site; or
   a suggestion to alter an identified nested table of the site.

3. One or more computing devices as recited in claim 1, wherein the site-performance toolkit further comprises a safety-mode component to enable the operator of the site to specify, for another specified operator of the site, a maximum latency or a maximum weight that the other specified operator cannot exceed when altering a page of the site.

4. One or more computing devices as recited in claim 3, wherein the safety-mode component refrains from launching a page altered by the other specified operator when the altered page exceeds the maximum latency or the maximum weight.

5. One or more computing devices as recited in claim 1, wherein the site-performance toolkit further comprises a safety-mode component to enable the operator of the site to specify, for each of multiple other specified operators of the site, a maximum latency or a maximum page weight that the other specified operators cannot exceed when altering a page of the site.

6. One or more computing devices comprising:
   one or more processors;
   memory; and
   a site-performance toolkit, stored in the memory and executable on the one or more processors to provide feedback to an operator of a site, the site-performance toolkit, comprising:
      a weight calculator to calculate a weight of at least a portion of the site and to provide the calculated weight to the operator of the site; and
      a suggestion component to provide one or more suggestions to the operator of the site to reduce the calculated weight, wherein the feedback provided to the operator comprises:
         a visual simulation of the portion of the site as modified in accordance with the one or more suggestions,
         a rendering of the portion of the site, displayed with the visual simulation, without the one or more suggestions,
         an icon displayed with the visual simulation to modify the portion of the site as shown in the visual simulation in response to input from the user, and
         a percentile indicative of a comparison between a first latency of rendering content within a discrete area of a particular page of the site, and a second latency associated with an additional area of at least one additional site identified by the operator, wherein the additional area corresponds to the discrete area, and the percentile is displayed, together with the first latency, within the discrete area.

7. One or more computing devices as recited in claim 6, wherein the weight calculator calculates a weight of the site as a whole, a weight of the page or set of pages of the site, or a weight of a slot or set of slots of a page of the site.

8. One or more computing devices as recited in claim 6, wherein the site-performance toolkit further comprises a latency calculator to calculate a respective latency for each feature of a plurality of features included on the page of the site, the site-performance toolkit being configured to provide each latency together with its respective feature to the operator of the site.

9. One or more computing devices as recited in claim 8, wherein the latency calculator is configured to calculate latency for rendering content within a plurality of discrete areas of the page of the site, on a per-area basis, wherein at least one feature of the plurality of features may be rendered in a corresponding area of the plurality of areas.

10. One or more computing devices as recited in claim 6, wherein the one or more suggestions provided by the suggestion component comprise:
 a suggestion to compress an image on the site;
 a suggestion to reduce a number of images on the page of the site;
 a suggestion to move content from a first portion of the site having a relatively large weight to a second portion of the site having a relatively small weight;
 a suggestion to cache a script that is frequently used on the site; or
 a suggestion to alter an identified nested table of the site.

11. One or more computing devices as recited in claim 6, wherein the site-performance toolkit further comprises a safety-mode component to enable the operator of the site to specify, for another specified operator of the site, a maximum weight that the other specified operator cannot exceed when altering the page of the site.

12. One or more computing devices as recited in claim 11, wherein the safety-mode component refrains from launching a page altered by the other specified operator when the altered page exceeds the maximum latency or the maximum weight.

13. One or more computing devices comprising:
 one or more processors;
 memory; and
 a site-performance toolkit, stored in the memory and executable on the one or more processors to provide feedback to an operator of a site, the site-performance toolkit, comprising:
  a latency calculator to simulate one or more requests for a page of the site, to calculate a latency to render content of the page based at least in part on the one or more requests, wherein:
   the content comprises a plurality of features,
   the page of the site comprises a plurality of discrete areas, wherein at least one feature of the plurality of features is to be rendered within a respective area of the plurality of areas, and
   the calculated latency comprises respective latencies for each area of the plurality of areas,
  to provide at least one latency of the respective latencies to the operator of the site by displaying the at least one latency within a particular area of the plurality of areas to which the at least one latency corresponds, to compare the at least one latency to an additional latency associated with an additional area of at least one additional site identified by the operator, wherein the additional area corresponds to the particular area, to generate a percentile indicative of the comparison, and to display the percentile, together with the at least one latency, within the particular area; and
  a suggestion component to provide one or more suggestions to the operator of the site to reduce the calculated latency.

14. One or more computing devices as recited in claim 13, wherein the one or more suggestions provided by the suggestion component comprise:
 a suggestion to compress an image on the site;
 a suggestion to reduce a number of images on the page of the site;
 a suggestion to move content from a first portion of the site having a relatively large weight to a second portion of the site having a relatively small weight;
 a suggestion to cache a script that is frequently used on the site; or
 a suggestion to alter an identified nested table of the site.

15. One or more computing devices as recited in claim 13, wherein the site-performance toolkit further comprises a weight calculator to calculate a weight of at least a portion of the site and to provide the calculated weight to the operator of the site.

16. One or more computing devices as recited in claim 13, wherein the site-performance toolkit further comprises a safety-mode component to enable the operator of the site to specify, for another specified operator of the site, a maximum latency or a maximum weight that the other specified operator cannot exceed when altering a page of the site.

17. One or more computing devices as recited in claim 16, wherein the safety-mode component refrains from launching a page altered by the other specified operator when the altered page exceeds the maximum latency or the maximum weight.

18. One or more computer-readable media storing computer-executable instructions that, when executed by one or more processors, cause the one or more processors to perform acts comprising:
 identifying a latency associated with rendering content within at least one discrete area of a plurality of areas on a particular page of a first site, wherein the latency is identified on a per-area basis, and wherein content rendered within each area of the plurality of areas comprises at least one feature of the first site;
 comparing, on a per-area basis, the identified latency associated with the first site to respective latencies associated with areas of multiple other sites, wherein the areas of multiple other sites correspond to the discrete area;
 generating a percentile indicative of the comparison; and
 serving a user interface indicating how, on a per-area basis, the latency associated with the first site compares with the latencies associated with corresponding areas of the multiple other sites, wherein the user interface displays the latency associated with the first site, together with the percentile, within the at least one discrete area.

19. One or more computer-readable media as recited in claim 18, wherein
 the latency associated with the at least one discrete area of the first site comprises a latency distribution,
 the latency distribution being generated based on multiple simulated requests for the particular page, and
  wherein at least one of a latency of serving the content from the first site, a latency of a network to which the first site is connected, a performance of a device including the one or more processors, and a load of requests at the first site varies for each simulated request.

20. One or more computer-readable media as recited in claim 18, wherein:
the first site is associated with a particular category; and
the multiple other sites are also associated with the particular category.

21. One or more computer-readable media as recited in claim 18, wherein the latency associated with the first site comprises a latency to render a set of features in the at least one discrete area of the particular page of the first site.

22. One or more computer-readable media as recited in claim 18, wherein the first site is associated with a particular category, and further comprising identifying the multiple other sites as also being associated with the particular category prior to the comparing.

23. One or more computer-readable media as recited in claim 18, further comprising receiving a selection of the multiple other sites from an operator of the first site prior to the comparing, and wherein the serving of the user interface comprises serving the user interface to the operator of the first site.

24. One or more computing devices as recited in claim 1, wherein the feedback provided to the operator comprises:
a visual simulation of the portion of the site as modified in accordance with the one or more suggestions,
a rendering of the portion of the site, displayed with the visual simulation, without the one or more suggestions, and
an icon displayed with the visual simulation to modify the portion of the site as shown in the visual simulation in response to input from the user.

25. One or more computing devices as recited in claim 1, wherein the calculated latency comprises one of a mean latency, a median latency, and a distribution of latencies associated with rendering the particular area.

26. One or more computing devices as recited in claim 1, wherein the latency calculator is configured to create a latency distribution associated with the at least one feature of the plurality of features, the latency distribution being generated based on a plurality of simulated page requests, wherein at least one of a latency of serving content from the site, a latency of a network to which the site is connected, a performance of the one or more computing devices, and a load of requests at the site varies for each simulated request,
the site-performance toolkit being configured to compare the latency distribution with respective latencies associated with corresponding features of multiple other sites.

27. One or more computing devices as recited in claim 1, wherein the site-performance toolkit is configured to display the at least one latency within the discrete area without rendering the at least one feature corresponding to the discrete area.

28. One or more computing devices as recited in claim 1, wherein providing the at least one latency of the respective latencies to the operator of the site includes indicating, within the particular area, the corresponding at least one feature without rendering the corresponding at least one feature.

29. One or more computer-readable media as recited in claim 18, wherein the acts performed by the one or more processors further comprise:
generating a visual simulation, via the user interface, of the at least one discrete area as modified in accordance with one or more suggestions,
rendering the portion of the site with the visual simulation, wherein the portion is rendered without the one or more suggestions, and
displaying an icon with the visual simulation to modify the portion of the site as shown in the visual.

30. One or more computing devices as recited in claim 1, wherein the displayed at least one latency comprises a latency associated with rendering more than one feature of the plurality of features within the particular area.

31. One or more computing devices as recited in claim 1, wherein the site-performance toolkit is configured to display the at least one latency within the discrete area together with visual indicia identifying a category of features to which the at least one latency corresponds.

* * * * *